United States Patent
Hirzallah et al.

(10) Patent No.: US 12,238,556 B2
(45) Date of Patent: *Feb. 25, 2025

(54) SUBBAND REFERENCE SIGNAL MEASUREMENTS

(71) Applicant: QUALCOMM Incorporated, San Diego, CA (US)

(72) Inventors: Mohammed Ali Mohammed Hirzallah, San Diego, CA (US); Arumugam Chendamarai Kannan, San Diego, CA (US); Srinivas Yerramalli, San Diego, CA (US); Xiaoxia Zhang, San Diego, CA (US); Vasanthan Raghavan, West Windsor Township, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,347

(22) Filed: Jun. 23, 2023

(65) Prior Publication Data
US 2024/0121640 A1    Apr. 11, 2024

Related U.S. Application Data

(63) Continuation of application No. 17/138,170, filed on Dec. 30, 2020, now Pat. No. 11,729,646.

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0626* (2013.01); *H04L 5/0048* (2013.01); *H04W 72/046* (2013.01)

(58) Field of Classification Search
CPC .. H04W 24/08; H04W 72/046; H04B 7/0626; H04B 7/02; H04L 5/0048; H04L 5/0025; H04L 5/0057; H04L 5/0094; H04L 5/005
See application file for complete search history.

(56) References Cited

U.S. PATENT DOCUMENTS 11,729,646 B2 * 8/2023 Hirzallah .............. H04L 5/0057
                                                          370/252
2015/0009924 A1 * 1/2015 Takano .................. H04W 24/10
                                                          370/329
(Continued)

FOREIGN PATENT DOCUMENTS

WO    2018082016 A1    5/2018

OTHER PUBLICATIONS

"5G Measurement Adaptation Based on Channel Hardening Occurrence"; Monteiro et al.; IEEE Communications Letters, vol. 23, No. 9, Sep. 2019 (Year: 2019).*

(Continued)

*Primary Examiner* — Benjamin H Elliott, IV
(74) *Attorney, Agent, or Firm* — Holland & Hart LLP

(57) ABSTRACT

Methods, systems, and devices for wireless communications are described. In some wireless communications systems, a base station may transmit a set of reference signals spanning a channel to a user equipment (UE), where each of the reference signals is associated with one of a set of transmit beams. The UE may measure a signal quality of each of the set of reference signals. In some cases, each measured signal quality may correspond to one of a set of subbands of the channel and one of the set of transmit beams. The UE may then transmit an indication of at least one signal quality associated with one of the set of subbands and one of the set of transmit beams. In some cases, the UE may indicate the (Continued)

at least one signal quality according to a configuration that may be indicated by the base station or selected by the UE.

26 Claims, 16 Drawing Sheets

(51) Int. Cl.
*H04L 5/00* (2006.01)
*H04W 72/044* (2023.01)

(56) References Cited

U.S. PATENT DOCUMENTS

| | | | | |
|---|---|---|---|---|
| 2017/0141827 A1* | 5/2017 | Liu | ........................ | H04L 5/0048 |
| 2018/0034612 A1* | 2/2018 | Lin | ...................... | H04B 7/0626 |
| 2018/0227866 A1* | 8/2018 | Jung | ..................... | H04L 5/0053 |
| 2018/0241458 A1* | 8/2018 | Jung | ..................... | H04B 7/0617 |
| 2019/0081677 A1* | 3/2019 | Kim | ...................... | H04B 7/0456 |
| 2019/0190668 A1* | 6/2019 | Lei | ......................... | H04L 1/0017 |
| 2020/0052803 A1* | 2/2020 | Deenoo | ................. | H04W 48/12 |
| 2020/0228182 A1* | 7/2020 | Nilsson | ................ | H04B 7/0647 |
| 2020/0228282 A1* | 7/2020 | Kwak | .................... | H04L 5/0057 |
| 2021/0067221 A1* | 3/2021 | Yang | ..................... | H04W 72/23 |
| 2021/0391909 A1* | 12/2021 | Lee | ......................... | H04B 7/063 |
| 2022/0029675 A1* | 1/2022 | Huang | ................. | H04B 7/0695 |
| 2022/0060301 A1* | 2/2022 | Lin | ........................ | H04L 5/0057 |
| 2022/0094399 A1* | 3/2022 | Gao | ........................ | H04B 7/0417 |
| 2022/0095254 A1* | 3/2022 | Zhu | .......................... | H04L 5/005 |
| 2022/0182123 A1* | 6/2022 | Hao | ........................ | H04L 5/0023 |
| 2022/0210674 A1* | 6/2022 | Hirzallah | ................ | H04L 5/005 |

OTHER PUBLICATIONS

Futurewei: "Remaining Details on Measurement Procedures", 3GPP TSG RAN WG1 Meeting #101-e, R1-2003810 e-Meeting, May 25-Jun. 5, 2020, 3 Pages.

OPPO: "Remaining Issues on Measurements for NR Positioning", 3GPP TSG RAN WG1 #100, R1-2000464, e-Meeting, Feb. 24-Mar. 6, 2020, 5 Pages.

Samsung: "Physical-Layer Procedures to Support UE/gNB Measurements", 3GPP TSG RAN WG1 #100-e, R1-2000642, Athens, Greece, Feb. 24-28, 2020, pp. 1-4.

* cited by examiner

SUBBAND REFERENCE SIGNAL MEASUREMENTS

CROSS-REFERENCE TO RELATED APPLICATIONS

This application is a continuation of U.S. Non-Provisional application Ser. No. 17/138,170, entitled "SUBBAND REFERENCE SIGNAL MEASUREMENTS", filed Dec. 30, 2020, which is hereby incorporated by reference in its entirety as if fully set forth below and for all applicable purposes.

FIELD OF TECHNOLOGY

The present disclosure relates to wireless communications, including subband reference signal measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support subband reference signal measurements. Generally, the described techniques provide for a user equipment (UE) to report channel state information (CSI) for a subband of a channel that is less than a bandwidth spanned by the channel. For example, the channel may include a set of subbands that collectively span the channel. A base station may transmit a set of reference signals that each span the channel and are each associated with one of a set of transmit beams. A UE receiving the set of reference signals may perform channel measurements to identify a signal quality associated with the channel. In some cases, the UE may measure signal qualities corresponding to one of the set of reference signals (e.g., one of the set of transmit beams) and one of the set of subbands. That is, each measured signal quality may be associated with one of the transmit beams and one of the subbands of the channel. The UE may then indicate at least one of the signal qualities to the base station.

A method for wireless communications at UE is described. The method may include receiving a set of reference signals from a base station, each of the set of reference signals spanning a channel and associated with one of a set of transmit beams from the base station, measuring a signal quality of each of the set of reference signals, each measured signal quality corresponding to one of a set of multiple subbands of the channel, and transmitting, to the base station, an indication of at least a first signal quality associated with a first subband of the set of multiple subbands and a first transmit beam of the set of transmit beams.

An apparatus for wireless communications at a UE is described. The apparatus may include a processor, memory in electronic communication with the processor, and instructions stored in the memory. The instructions may be executable by the processor to cause the apparatus to receive a set of reference signals from a base station, each of the set of reference signals spanning a channel and associated with one of a set of transmit beams from the base station, measure a signal quality of each of the set of reference signals, each measured signal quality corresponding to one of a set of multiple subbands of the channel, and transmit, to the base station, an indication of at least a first signal quality associated with a first subband of the set of multiple subbands and a first transmit beam of the set of transmit beams.

Another apparatus for wireless communications at a UE is described. The apparatus may include means for receiving a set of reference signals from a base station, each of the set of reference signals spanning a channel and associated with one of a set of transmit beams from the base station, means for measuring a signal quality of each of the set of reference signals, each measured signal quality corresponding to one of a set of multiple subbands of the channel, and means for transmitting, to the base station, an indication of at least a first signal quality associated with a first subband of the set of multiple subbands and a first transmit beam of the set of transmit beams.

A non-transitory computer-readable medium storing code for wireless communications at a UE is described. The code may include instructions executable by a processor to receive a set of reference signals from a base station, each of the set of reference signals spanning a channel and associated with one of a set of transmit beams from the base station, measure a signal quality of each of the set of reference signals, each measured signal quality corresponding to one of a set of multiple subbands of the channel, and transmit, to the base station, an indication of at least a first signal quality associated with a first subband of the set of multiple subbands and a first transmit beam of the set of transmit beams.

Some examples of the method, apparatuses, and non-transitory computer-readable medium described herein may further include operations, features, means, or instructions for receiving, from the base station, a configuration which identifies one or more subbands of the channel for which the UE may be to obtain and transmit the measured signal qualities.

In some examples of the method, apparatuses, and non-transitory computer-readable medium described herein, selecting, at the UE, one or more subbands of the channel for which the UE may be to obtain and transmit the measured signal qualities.

In some examples of the method, apparatuses, and non-transitory computer-readable medium described herein, transmitting the indication of at least the first signal quality associated with the first subband and the first transmit beam may include operations, features, means, or instructions for including in the indication one or more of the measured signal qualities for each of one or more of the set of multiple subbands, each of the one or more of the measured signal qualities associated with an individual subband of the one or more of the set of multiple subbands corresponding to different ones of the set of transmit beams.

Some examples of the method, apparatuses, and non-transitory computer-readable medium described herein may further include operations, features, means, or instructions for identifying a first quantity of the set of transmit beams for which the measured signal qualities may be to be reported for each of the one or more of the set of multiple subbands, where a number of the one or more of the measured signal qualities included in the indication for each of the one or more of the set of multiple subbands may be less than or equal to the first quantity of the set of transmit beams.

In some examples of the method, apparatuses, and non-transitory computer-readable medium described herein, identifying the first quantity of the set of transmit beams for which the measured signal qualities may be to be reported may include operations, features, means, or instructions for receiving an indicator of the first quantity from the base station.

In some examples of the method, apparatuses, and non-transitory computer-readable medium described herein, identifying the first quantity of the set of transmit beams for which the measured signal qualities may be to be reported may include operations, features, means, or instructions for selecting a value of the first quantity at the UE.

Some examples of the method, apparatuses, and non-transitory computer-readable medium described herein may further include operations, features, means, or instructions for reporting to the base station the selected value of the first quantity.

In some examples of the method, apparatuses, and non-transitory computer-readable medium described herein, a value of the first quantity may be subband-specific.

Some examples of the method, apparatuses, and non-transitory computer-readable medium described herein may further include operations, features, means, or instructions for selecting the one or more of the measured signal qualities included in the indication for each of the one or more of the set of multiple subbands based on respective strengths of the measured signal qualities of each of the set of reference signals.

In some examples of the method, apparatuses, and non-transitory computer-readable medium described herein, transmitting the indication of at least the first signal quality associated with the first subband and the first transmit beam may include operations, features, means, or instructions for including in the indication one or more of the measured signal qualities for each of one or more of the set of transmit beams, each of the one or more of the measured signal qualities associated with an individual transmit beam of the one or more of the set of transmit beams corresponding to different ones of the set of multiple subbands.

Some examples of the method, apparatuses, and non-transitory computer-readable medium described herein may further include operations, features, means, or instructions for identifying a first quantity of the set of multiple subbands for which the measured signal qualities may be to be reported for each of the one or more of the set of transmit beams, where a number of the one or more of the measured signal qualities included in the indication for each of the one or more of the set of transmit beams may be less than or equal to the first quantity of the set of multiple subbands.

In some examples of the method, apparatuses, and non-transitory computer-readable medium described herein, identifying the first quantity of the set of multiple subbands for which the measured signal qualities may be to be reported may include operations, features, means, or instructions for receiving an indicator of the first quantity from the base station.

In some examples of the method, apparatuses, and non-transitory computer-readable medium described herein, identifying the first quantity of the set of multiple subbands for which the measured signal qualities may be to be reported may include operations, features, means, or instructions for selecting a value of the first quantity at the UE.

Some examples of the method, apparatuses, and non-transitory computer-readable medium described herein may further include operations, features, means, or instructions for reporting to the base station the selected value of the first quantity.

In some examples of the method, apparatuses, and non-transitory computer-readable medium described herein, a value of the first quantity may be transmit beam-specific.

Some examples of the method, apparatuses, and non-transitory computer-readable medium described herein may further include operations, features, means, or instructions for selecting the one or more of the measured signal qualities included in the indication for each of the one or more of the set of transmit beams based on respective strengths of the measured signal qualities of each of the set of reference signals.

In some examples of the method, apparatuses, and non-transitory computer-readable medium described herein, transmitting the indication of at least the first signal quality associated with the first subband and the first transmit beam may include operations, features, means, or instructions for including in the indication one or more of the measured signal qualities for each of one or more pairs of subbands from the set of multiple subbands and transmit beams from the set of transmit beams.

Some examples of the method, apparatuses, and non-transitory computer-readable medium described herein may further include operations, features, means, or instructions for receiving, from the base station, an indicator of multiple pairs of subbands and transmit beams from which the one or more pairs may be selected and receiving, from the base station, a first quantity of the multiple pairs of subbands for which the UE may be to include corresponding measured signal qualities in the indication transmitted to the base station, the first quantity being equal to a number of the one or more pairs.

Some examples of the method, apparatuses, and non-transitory computer-readable medium described herein may further include operations, features, means, or instructions for transmitting, to the base station, indices of the one or more pairs selected from the multiple pairs.

In some examples of the method, apparatuses, and non-transitory computer-readable medium described herein, a first size of the first subband of the set of multiple subbands may be different than a second size of a second subband of the set of multiple subbands.

In some examples of the method, apparatuses, and non-transitory computer-readable medium described herein, the set of reference signals include synchronization signal blocks (SSBs), channel state information reference signals (CSI-RSs), or a combination thereof.

In some examples of the method, apparatuses, and non-transitory computer-readable medium described herein, the indication of at least the first signal quality includes an indicator of a reference signal received power (RSRP) associated with the first subband and the first transmit beam.

A method for wireless communications at a base station is described. The method may include transmitting a set of reference signals to a UE, each of the set of reference signals spanning a channel and associated with one of a set of transmit beams from the base station, receiving, from the UE and in response to transmission of the set of reference signals, an indication of at least a first signal quality associated with a first subband of a set of multiple subbands that together span the channel and a first transmit beam of the base station, and communicating with the UE via transmissions over the first subband and the first transmit beam based on receiving the indication.

An apparatus for wireless communications at a base station is described. The apparatus may include a processor, memory in electronic communication with the processor, and instructions stored in the memory. The instructions may be executable by the processor to cause the apparatus to transmit a set of reference signals to a UE, each of the set of reference signals spanning a channel and associated with one of a set of transmit beams from the base station, receive, from the UE and in response to transmission of the set of reference signals, an indication of at least a first signal quality associated with a first subband of a set of multiple subbands that together span the channel and a first transmit beam of the base station, and communicate with the UE via transmissions over the first subband and the first transmit beam based on receiving the indication.

Another apparatus for wireless communications at a base station is described. The apparatus may include means for transmitting a set of reference signals to a UE, each of the set of reference signals spanning a channel and associated with one of a set of transmit beams from the base station, means for receiving, from the UE and in response to transmission of the set of reference signals, an indication of at least a first signal quality associated with a first subband of a set of multiple subbands that together span the channel and a first transmit beam of the base station, and means for communicating with the UE via transmissions over the first subband and the first transmit beam based on receiving the indication.

A non-transitory computer-readable medium storing code for wireless communications at a base station is described. The code may include instructions executable by a processor to transmit a set of reference signals to a UE, each of the set of reference signals spanning a channel and associated with one of a set of transmit beams from the base station, receive, from the UE and in response to transmission of the set of reference signals, an indication of at least a first signal quality associated with a first subband of a set of multiple subbands that together span the channel and a first transmit beam of the base station, and communicate with the UE via transmissions over the first subband and the first transmit beam based on receiving the indication.

Some examples of the method, apparatuses, and non-transitory computer-readable medium described herein may further include operations, features, means, or instructions for transmitting, to the UE, a configuration which identifies one or more subbands of the channel for which the UE may be to measure signal qualities, including the first subband.

In some examples of the method, apparatuses, and non-transitory computer-readable medium described herein, receiving the indication of at least the first signal quality associated with the first subband and the first transmit beam may include operations, features, means, or instructions for receiving in the indication one or more measured signal qualities for each of one or more of the set of multiple subbands, each of the one or more measured signal qualities associated with an individual subband of the one or more of the set of multiple subbands corresponding to different ones of the set of transmit beams.

Some examples of the method, apparatuses, and non-transitory computer-readable medium described herein may further include operations, features, means, or instructions for identifying a first quantity of the set of transmit beams for which the measured signal qualities may be to be reported for each of the one or more of the set of multiple subbands, where a number of the one or more measured signal qualities included in the indication for each of the one or more of the set of multiple subbands may be less than or equal to the first quantity of the set of transmit beams.

In some examples of the method, apparatuses, and non-transitory computer-readable medium described herein, identifying the first quantity of the set of transmit beams for which the measured signal qualities may be to be reported may include operations, features, means, or instructions for transmitting an indicator of the first quantity to the UE.

In some examples of the method, apparatuses, and non-transitory computer-readable medium described herein, identifying the first quantity of the set of transmit beams for which the measured signal qualities may be to be reported may include operations, features, means, or instructions for receiving a report from the UE of a UE-selected value of the first quantity.

In some examples of the method, apparatuses, and non-transitory computer-readable medium described herein, a value of the first quantity may be subband-specific.

In some examples of the method, apparatuses, and non-transitory computer-readable medium described herein, receiving the indication of at least the first signal quality associated with the first subband and the first transmit beam may include operations, features, means, or instructions for receiving in the indication one or more measured signal qualities for each of one or more of the set of transmit beams, each of the one or more measured signal qualities associated with an individual transmit beam of the one or more of the set of transmit beams corresponding to different ones of the set of multiple subbands.

Some examples of the method, apparatuses, and non-transitory computer-readable medium described herein may further include operations, features, means, or instructions for identifying a first quantity of the set of multiple subbands for which the measured signal qualities may be to be reported for each of the one or more of the set of transmit beams, where a number of the one or more measured signal qualities included in the indication for each of the one or more of the set of transmit beams may be less than or equal to the first quantity of the set of multiple subbands.

In some examples of the method, apparatuses, and non-transitory computer-readable medium described herein, identifying the first quantity of the set of multiple subbands for which the measured signal qualities may be to be reported may include operations, features, means, or instructions for transmitting an indicator of the first quantity to the UE.

In some examples of the method, apparatuses, and non-transitory computer-readable medium described herein, identifying the first quantity of the set of multiple subbands for which the measured signal qualities may be to be reported may include operations, features, means, or instructions for receiving a report from the UE indicating a UE-selected value of the first quantity.

In some examples of the method, apparatuses, and non-transitory computer-readable medium described herein, a value of the first quantity may be transmit beam-specific.

In some examples of the method, apparatuses, and non-transitory computer-readable medium described herein, receiving the indication of at least the first signal quality associated with the first subband and the first transmit beam may include operations, features, means, or instructions for receiving in the indication one or more measured signal qualities for each of one or more pairs of subbands from the set of multiple subbands and transmit beams from the set of transmit beams.

Some examples of the method, apparatuses, and non-transitory computer-readable medium described herein may further include operations, features, means, or instructions for transmitting, to the UE, an indicator of multiple pairs of subbands and transmit beams from which the one or more pairs may be selected and transmitting, to the UE, a first quantity of the multiple pairs of subbands for which the UE may be to include corresponding measured signal qualities in the indication transmitted to the base station, the first quantity being equal to a number of the one or more pairs.

Some examples of the method, apparatuses, and non-transitory computer-readable medium described herein may further include operations, features, means, or instructions for receiving, from the UE, indices of the one or more pairs selected by the UE from the multiple pairs.

In some examples of the method, apparatuses, and non-transitory computer-readable medium described herein, a first size of the first subband of the set of multiple subbands may be different than a second size of a second subband of the set of multiple subbands.

In some examples of the method, apparatuses, and non-transitory computer-readable medium described herein, the set of reference signals include SSBs, CSI-RSs, or a combination thereof.

In some examples of the method, apparatuses, and non-transitory computer-readable medium described herein, the indication of at least the first signal quality includes an indicator of an RSRP associated with the first subband and the first transmit beam.

DETAILED DESCRIPTION

Figure 1:
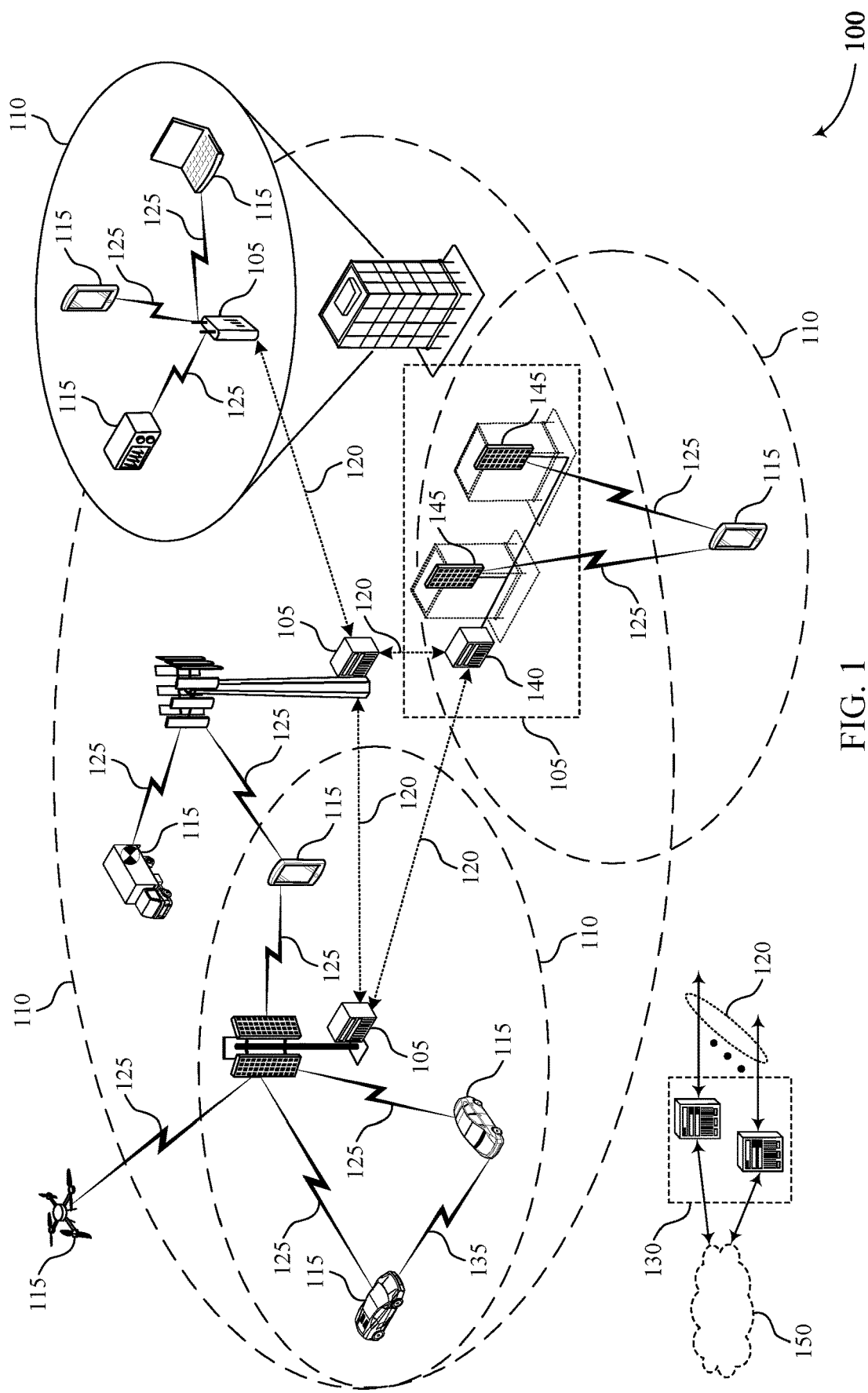
FIG. 1 illustrates an example of a wireless communications system that supports subband reference signal measurements in accordance with aspects of the present disclosure.

In some wireless communications systems, a base station (or other transmitting device such as a user equipment (UE)) may transmit reference signals that each span a channel to a UE, where each of the reference signals is associated with a different transmit beam. The UE may then perform channel measurements based on each of the received reference signals and indicate the channel measurements to the base station. Thus, the base station and UE may identify one of the transmit beams associated with more reliable communications when compared to the remaining transmit beams. In some cases, the channel may include a set of subbands that each span a subset of the channel. Here, the base station and UE may communicate using one or more of the subbands (e.g., instead of the entire channel). In some examples, a reliability of communications associated with a single transmit beam may differ between various subbands of a channel. That is, communications transmitted via a first subband and associated with a first transmit beam may be more reliable than communications transmitted via a second subband and associated with the first transmit beam. Thus, it may be desirable for the UE to indicate a signal quality that is associated with one of the transmit beams and one of the subbands.

Generally, the described techniques provide for a UE to report a measured signal quality associated with a subband of a channel that is less than a bandwidth spanned by the channel. For example, upon receiving a set of reference signals, the UE may measure signal qualities corresponding to one of the set of reference signals (e.g., one of the set of transmit beams) and one of the set of subbands. Thus, each measured signal quality may be associated with one of the transmit beams and one of the subbands of the channel. The UE may then indicate at least one of the signal qualities to the base station.

The UE may indicate the at least one signal quality according to a reporting configuration that may be configured by the base station or selected by the UE. In one example, the reporting configuration may indicate one or more of the transmit beams. Here, the UE may transmit one or more signal qualities for each of the indicated transmit beams, where each of the one or more signal qualities are associated with different subbands. In another example, the reporting configuration may indicate one or more of the subbands. Here, the UE may transmit one or more signal qualities for each of the indicated subbands, where each of the one or more signal qualities are associated with different transmit beams. In another example, the reporting configuration may indicate for the UE to identify a certain quantity of the best pairs of transmit beams and subbands. Here, the UE may indicate the quantity of transmit beam and subband pairs associated with the highest measured signal qualities.

Aspects of the disclosure are initially described in the context of wireless communications systems. Aspects of the disclosure are further illustrated by and described with reference to a process flow, apparatus diagrams, system diagrams, and flowcharts that relate to subband reference signal measurements.

FIG. 1 illustrates an example of a wireless communications system 100 that supports subband reference signal measurements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths.

In some examples, each served UE 115 may be configured for operating over portions (e.g., a subband, a BWP) or all of a carrier bandwidth. For example, a carrier bandwidth may be associated with a channel spanning a first bandwidth of the radio frequency spectrum. The channel may include a set of subbands that collectively span the channel. Here, each served UE 115 may communicate with a base station 105 over the channel using one or more of the subbands.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, the 2.4 GHz band, the 60 GHz band, the 3.6 GHz band, the 900 MHz band, the scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions or multiple transmit beams, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (e.g., a cell-specific reference signal (CRS), a channel state information reference signal (CSI-RS), a synchronization signal block (SSB)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook).

In some cases, a base station 105 may transmit, to a UE 115, reference signals that each span a channel, where each of the reference signals is associated with a different transmit beam. The UE 115 may then perform channel measurements based on each of the received reference signals and indicate the channel measurements to the base station 105. Thus, the base station 105 and UE 115 may identify one of the transmit beams associated with more reliable communications when compared to the remaining transmit beams. In some cases, the channel may include a set of subbands that each span a subset of the channel. Here, the base station 105 and UE 115 may communicate using a portion of the channel corresponding to a subband of the channel.

In some examples, a reliability of communications associated with a single transmit beam may differ between various subbands of a channel. That is, communications transmitted via a first subband and associated with a first transmit beam may be more reliable than communications transmitted via a second subband and associated with the first transmit beam. For example, the base station 105 may utilize transmit beams that are optimized for a certain frequency. Here, a reliability of communications transmitted via a subband associated with the optimized frequency for a transmit beam may be greater than communications transmitted via a different subband (e.g., not associated with the optimized frequency for the transmit beam). In some cases, the reliability of communications via subbands other than the subband including the optimized may be decreased due to beam squinting. Because of the variability of reliability of communications across different subbands, it may be desirable for the UE 115 to indicate a signal quality that is associated with one of the transmit beams and one of the subbands.

In the example of wireless communications system 100, the UE 115 report a measured signal quality associated with a subband of a channel that is less than a bandwidth spanned by the channel. For example, upon receiving a set of reference signals, the UE 115 may measure signal qualities corresponding to one of the set of reference signals (e.g., one of the set of transmit beams) and one of the set of subbands. Thus, each measured signal quality may be associated with one of the transmit beams and one of the subbands of the channel. The UE 115 may then indicate at least one of the signal qualities to the base station 105.

The UE 115 may indicate the at least one signal quality according to a reporting configuration that may be configured by the base station 105 or selected by the UE 115. In one example, the reporting configuration may indicate one or more of the transmit beams. Here, the UE 115 may transmit one or more signal qualities for each of the indicated transmit beams, where each of the one or more signal qualities are associated with different subbands. In another example, the reporting configuration may indicate one or more of the subbands. Here, the UE 115 may transmit one or more signal qualities for each of the indicated subbands, where each of the one or more signal qualities are associated with different transmit beams. In another example, the reporting configuration may indicate for the UE 115 to identify a certain quantity of the best pairs of transmit beams and subbands. Here, the UE 115 may indicate the quantity of transmit beam and subband pairs associated with the highest measured signal qualities.

Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Figure 2:
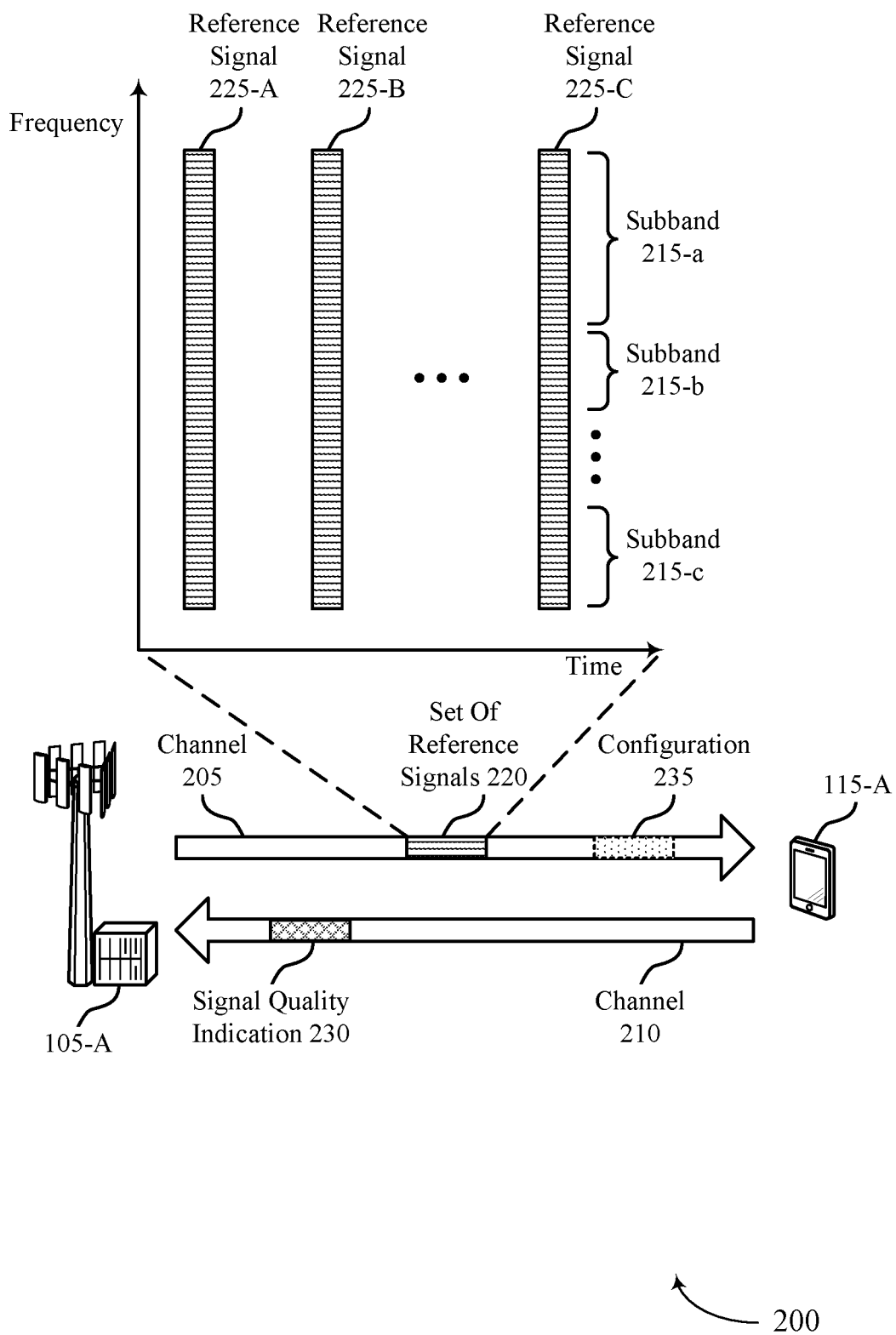
FIG. 2 illustrates an example of a wireless communications system that supports subband reference signal measurements in accordance with aspects of the present disclosure.

FIG. 2 illustrates an example of a wireless communications system 200 that supports subband reference signal measurements in accordance with aspects of the present disclosure. In some examples, the wireless communications system 200 may implement aspects of wireless communications system 100. The wireless communications system 200 may include a UE 115-a and a base station 105-a, which may be examples of a UE 115 and a base station 105, respectively, as described with reference to FIG. 1.

The base station 105-a may be in communication with the UE 115-a via the channels 205 and 210. In some cases, the channels 205 and 210 may be associated with a same set of frequency resources. In some other cases, the channels 205 and 210 may be associated with a different set of frequency resources. Additionally, the channel 205 may be associated with downlink communications (e.g., from the base station 105-a to the UE 115-a) and the channel 210 may be associated with uplink communications (e.g., from the UE 115-a to the base station 105-a). In some cases, the channel 210 may be a physical uplink control channel (PUCCH). The channel 205 may span a set of frequency resources associated with a set of subbands 215. That is, each subband 215 may be associated with a portion of the frequency resources associated with the channel 205. In some cases, the channel 205 may be a wideband channel 205 and the subbands 215 may collectively span the wideband channel 205. In some cases, each subband 215 may span a same quantity of frequency resources (e.g., may be a same bandwidth). In some other cases, the subbands 215 may span different quantities of frequency resources (e.g., may be different bandwidths). For example, the subband 215-a may include more frequency resources than the subband 215-b.

In one example, the base station 105-a may identify the subbands 215. Here, base station 105-a may transmit the configuration 235 to the UE 115-a indicating the subbands 215 that span the channel 205. For example, the configuration 235 may indicate, for each subband 215, a set of frequency resources associated with the subbands 215. In another example, the UE 115-a may select the subbands 215 for the channel 205. For example, the UE 115-a may identify each of the subbands 215 for the channel 205. In this example, the base station 105-a may not transmit the configuration 235 to the UE 115-a.

The base station 105-a may transmit a set of reference signals 220 to the UE 115-a to enable the UE 115-a to determine channel state information (CSI) associated with the channel 205. That is, the base station 105-a may transmit the set of reference signals 220 as part of an initial access procedure, for resource management, as part of a handover procedure, or other radio resource management procedure. The base station 105-a may transmit each reference signal 225 via one of a set of transmit beams. For example, the base station 105-a may transmit the reference signal 225-a using a first transmit beam, the reference signal 225-b using a second transmit beam, and the reference signal 225-c using a third transmit beam. Each of the reference signals 225 may span the frequency resources associated with the channel 205. In some cases, the reference signals 225 may be CSI-RSs. In some other cases, the reference signals 225 may be SSBs.

Based on receiving the set of reference signals 220, the UE 115-a may perform one or more channel measurements to determine CSI associated with the channel 205. That is, the UE 115-a may measure a signal quality associated with one of the reference signals 225-a across one of the subbands 215. For example, the UE 115-a may measure a first signal quality associated with the reference signal 225-a over the subband 215-a. Additionally, the UE 115-a may measure a second signal quality associated with the reference signal 225-a over the subband 215-b. In some cases, the measured signal quality may correspond to a reference signal received powers (RSRPs) (e.g., a layer one RSRP (L1-RSRP)).

In some cases, the UE 115-a may perform channel quality measurements for each subband 215 on each reference signal 225. That is, the UE 115-a may detect a channel measurement for each transmit beam (e.g., corresponding to one of the reference signals 225) and subband 215 pair. In some other cases, the UE 115-a may perform channel quality measurements for a subset of the transmit beams (e.g., corresponding to a subset of the reference signals 225) or a subset of the subbands 215. Additionally or alternatively, the UE 115-a may perform channel quality measurements for a subset of the subbands 215 depending on the associated transmit beam. That is, the UE 115-a may perform channel quality measurements for a first subset of the subbands 215 on the reference signal 225-a and for a second subset of the subbands 215 on the reference signal 225-b. In one example, the base station 105-a may indicate the subset of transmit beams or subbands 215 that the UE 115-a performs measurements on in the configuration 235. In another example, the UE 115-a may select the subset of transmit beams or subbands 215. In some cases, the UE 115-a may select the subset of transmit beams or subbands 215 based on historical data. That is, the UE 115-a may select the subset of transmit beams or subbands 215 that have historically been associated with a higher signal quality than other transmit beams or subbands 215.

After measuring the signal qualities associated with one or more transmit beam and subband 215 pairs, the UE 115-a may transmit a signal quality indication 230 to the base station 105-a. The signal quality indication 230 may include at least an indication of a first signal quality associated with one of the transmit beams (e.g., one of the reference signals 225) and one of the subbands 215. In some examples, the signal quality indication 230 may include an indication of a measured signal quality (e.g., an L1 RSRP) associated with one or more pairs of subbands 215 and transmit beams (e.g., reference signals 225). Additionally or alternatively, the signal quality indication 230 may include an indication of the one or more pairs of subbands 215 and transmit beams (e.g., indices indicating the subband 215 and transmit beam pairs). The UE 115-a may transmit the signal quality indication 230 according to a reporting configuration that indicates a set of signal qualities (e.g., each associated with one of a transmit beam and subband 215 pair) that the UE 115-a should include in the signal quality indication 230.

In a first example, the base station 105-a may indicate the reporting configuration to the UE 115-a (e.g., via the configuration 235). Here, the base station 105-a may indicate, via the configuration 235, the subset of subbands 215, the subset of reference signals 225, a quantity of measured signal qualities to report, or a combination thereof. In another example, the UE 115-a may select the reporting configuration. Here, the base station 105-a may not indicate the reporting configuration via the configuration 235. In this example, the UE 115-a may indicate (e.g., within the signal quality indication 230) the subset of subbands 215, the subset of reference signals 225, a quantity of measured signal qualities reported, or a combination thereof. In some cases, the UE 115-a may transmit the signal quality indication 230 periodically (e.g., according to a configured periodicity), aperiodically (e.g., in response to a trigger such as an indication from the base station 105-a), or semi persistently.

In one example, the reporting configuration may indicate for the UE 115-a to include, in the signal quality indication 230, an indication of one or more measured signal qualities for a subset of the subbands 215. In some cases, the reporting configuration may indicate for the UE 115-*a* to include an indication of one or more measured signal qualities for all of the subbands 215. In some other cases, the reporting configuration may indicate for the UE 115-*a* to include an indication of one or more measured signal qualities for a portion of the subbands 215 (e.g., subband 215-*a* and subband 215-*c*). Here, the UE 115-*a* may perform channel measurements on the subbands 215 that are included in the subset (e.g., subbands 215-*a* and 215-*c*) and may refrain from performing channel measurements on the subbands 215 not included in the subset.

In the example that the reporting configuration indicates for the UE 115-*a* to include an indication of one or more measured signal qualities for the subset of subbands 215, the reporting configuration may additionally indicate a quantity of measured signal qualities to report for each of the subbands 215 in the subset. Additionally, the quantity of measured signal qualities to report for each of the subbands 215 in the subset may be specific to each subband 215. For example, if the subset of subbands 215 incudes subbands 215-*a* and 215-*c*, the UE 115-*a* may indicate two measured signal qualities (each associated with one of the reference signals 225) for the subband 215-*a* and may indicate three measured signal qualities (each associated with one of the reference signals 225) for the subband 215-*c*. The UE 115-*a* may indicate the measured signal qualities that are associated with a highest signal quality for that subband 215. For example, the UE 115-*a* may indicate the measured signal qualities associated with the two reference signals 225 having the higher signal quality in the subband 215-*a* than the remaining reference signals 225 within the set of reference signals 220. Additionally, the UE 115-*a* may indicate the measured signal qualities associated with the three reference signals 225 having the higher signal quality in the subband 215-*c* than the remaining reference signals 225 within the set of reference signals 220.

In another example, the reporting configuration may indicate for the UE 115-*a* to include, in the signal quality indication 230, an indication of one or more measured signal qualities for a subset of the transmission beams (e.g., each associated with one of the set of reference signals 220). In some cases, the reporting configuration may indicate for the UE 115-*a* to include an indication of one or more measured signal qualities for all of the reference signals 225. In some other cases, the reporting configuration may indicate for the UE 115-*a* to include an indication of one or more measured signal qualities for a subset of the reference signals 225 (e.g., reference signal 225-*a* and reference signal 225-*b*). Here, the UE 115-*a* may perform channel measurements on the reference signals 225 that are included in the subset (e.g., reference signals 225-*a* and 225-*b*) and may refrain from performing channel measurements on the reference signals 225 not included in the subset.

In the example that the reporting configuration indicates for the UE 115-*a* to include an indication of one or more measured signal qualities for the subset of reference signals 225, the reporting configuration may additionally indicate a quantity of measured signal qualities to report for each of the reference signals 225 in the subset. Additionally, the quantity of measured signal qualities to report for each of the reference signals 225 in the subset may be specific to each reference signal 225. For example, if the subset of reference signals 225 incudes reference signals 225-*a* and 225-*b*, the UE 115-*a* may indicate two measured signal qualities (each associated with one of the subbands 215) for the reference signal 225-*a* and may indicate three measured signal qualities (each associated with one of the subbands 215) for the reference signal 225-*b*. The UE 115-*a* may indicate the measured signal qualities that are associated with a highest signal quality for that reference signal 225. For example, the UE 115-*a* may indicate the measured signal qualities associated with the two subbands 215 having the higher signal quality for the reference signal 225-*a* than the remaining subbands 215 within the channel 205. Additionally, the UE 115-*a* may indicate the measured signal qualities associated with the three subbands 215 having the higher signal quality for the reference signal 225-*b* than the remaining subbands 215 within the channel 205.

In another example, the reporting configuration may indicate for the UE 115-*a* to include, in the signal quality indication 230, an indication of a quantity of pairs of transmit beams and subbands 215 that are associated with a highest signal quality. For example, the reporting configuration may indicate for the UE 115-*a* to include an indication of the best three pairs of subbands 215 and transmit beams (e.g., each associated with one of the reference signals 225). Here, the UE 115-*a* may perform channel measurements on each of the pairs of subbands 215 and transmit beams and may indicate the three pairs having a higher signal quality (e.g., L1-RSRP) than the remaining pairs of subbands 215 and transmit beams. For example, the UE 115-*a* may indicate the indices associated with the subbands 215 and transmit beams of the pairs of subbands 215 and transmit beams that have the highest signal qualities.

After transmitting the signal quality indication 230 to the base station 105-*a*, the UE 115-*a* and base station 105-*a* may communicate using a subband 215 and transmit beam pair (e.g., associated with a relatively high signal quality when compared to other pairs of subbands 215 and transmit beams).

Figure 3:
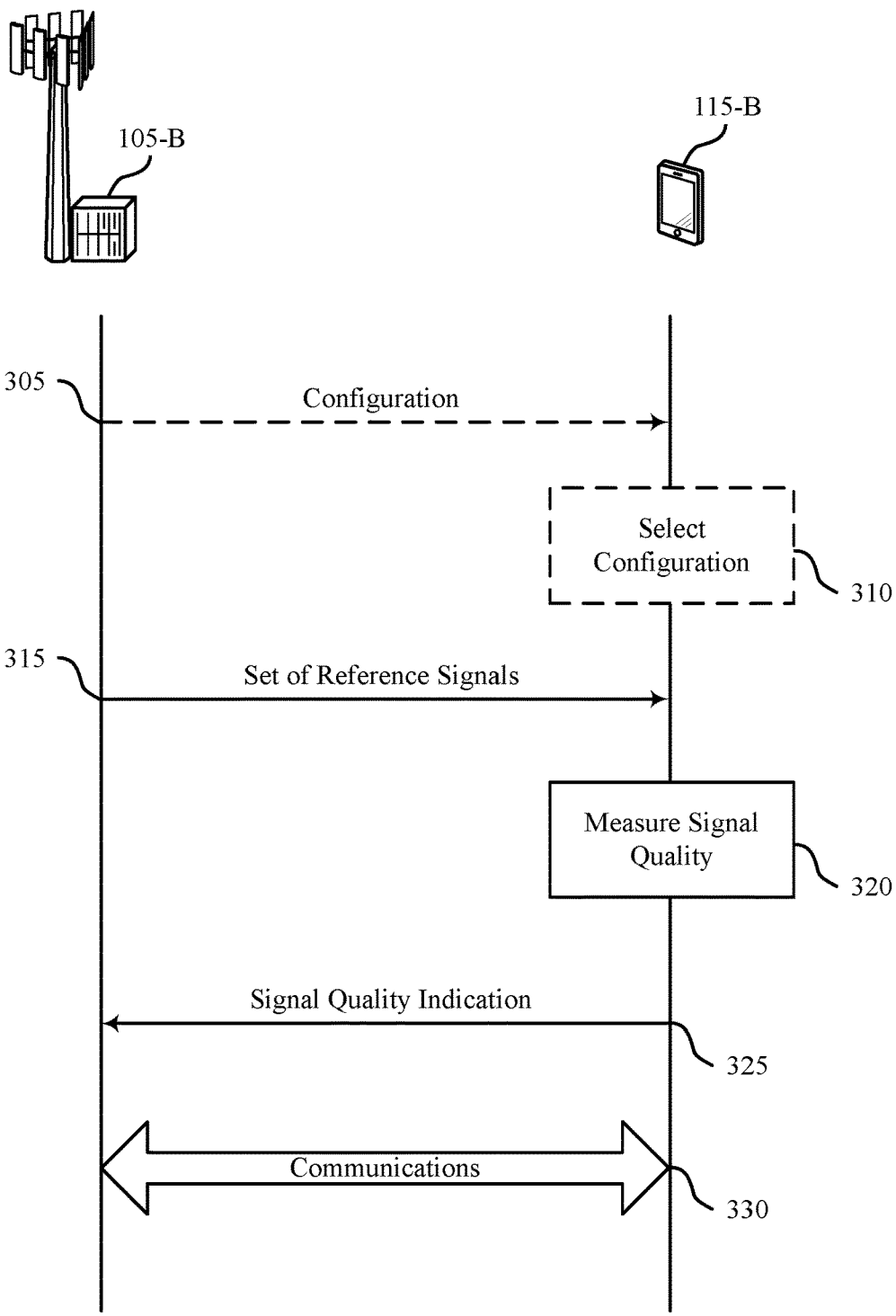
FIG. 3 illustrates an example of a process flow that supports subband reference signal measurements in accordance with aspects of the present disclosure.

FIG. 3 illustrates an example of a process flow 300 that supports subband reference signal measurements in accordance with aspects of the present disclosure. For example, the UE 115-*b* may be an example of the UEs 115 as described with respect to FIGS. 1 and 2. Additionally, the base station 105-*b* may be an example of the base stations 105 as described with respect to FIGS. 1 and 2. In the process flow 300, the UE 115-*a* may report CSI for one or more subbands of a channel.

At 305, the base station 105-*b* may optionally transmit a configuration to the UE 115-*b*. For example, the base station 105-*b* may transmit an indication of a subband configuration which identifies one or more subbands of a channel for which the UE 115-*b* is to obtain and transmit measured signal qualities. In this example, the UE 115-*b* may not select one or more subbands of the channel to obtain and transmit measured signal qualities (e.g., at 310).

In another example, the base station 105-*b* may transmit an indication of a reporting configuration for the UE 115-*b* to report measured signal qualities to the base station 105-*b*. In one case, the reporting configuration may indicate a first quantity of a set of transmit beams (e.g., used by the base station 105-*b* to transmit communications to the UE 115-*b*) for which the measured signal qualities are to be reported for each of the one or more of the set of subbands. In another case, the reporting configuration may indicate first quantity of the set of subbands for which the measured signal qualities are to be reported for each of the one or more of the set of transmit beams. In another case, the base station 105-*b* may indicate (e.g., in the reporting configuration) an indicator of multiple pairs of subbands and transmit beams. Here, the base station 105-*b* may additionally indicate a first quantity of the multiple pairs of subbands for which the UE is to include corresponding measured signal qualities in the indication transmitted to the base station, the first quantity being equal to a number of the one or more pairs.

At 310, the UE 115-*b* may optionally select a configuration. For example, the UE 115-*b* may select a subband configuration (e.g., in a case that the base station 105-*b* does not indicate the subband configuration to the UE 115-*b* at 305). Here, the UE 115-*b* may select one or more subbands of the channel for which the UE 115-*b* is to obtain and transmit the measured signal qualities.

In another example, the UE 115-*b* may select a reporting configuration for the UE 115-*b* to report measured signal qualities to the base station 105-*b*. In one case, the UE 115-*b* may select a value of a first quantity of a set of transmit beams (e.g., used by the base station 105-*b* to transmit communications to the UE 115-*b*) for which the measured signal qualities are to be reported for each of the one or more of the set of subbands. Here, the UE 115-*b* may report the selected value of the first quantity to the base station 105-*b* (e.g., at 325). In another case, the UE 115-*b* may select a value of first quantity of the set of subbands for which the measured signal qualities are to be reported for each of the one or more of the set of transmit beams. Here, the UE 115-*b* may report the selected value of the first quantity to the base station 105-*b* (e.g., at 325).

At 315, the base station 105-*b* may transmit a set of reference signals to the UE 115-*b*. That is, the UE 115-*b* may receive the set of reference signals from the base station 105-*b*, where each of the set of reference signals spans the channel and is associated with one of the set of transmit beams from the base station 105-*b*. In some cases, the sizes of the subbands may be unequal. Additionally, the set of reference signals may include CSI-RSs, SSBs, or both.

At 320, the UE 115-*b* may measure a signal quality of each of the set of reference signals, each measured signal quality corresponding to one of a set of subbands of the channel.

At 325, the UE 115-*b* may transmit, to the base station 105-*b*, an indication of at least a first signal quality associated with a first subband of the set of subbands and a first transmit beam of the set of transmit beams. That is, the UE 115-*b* may indicate one or more measured signal qualities to the base station 105-*b* in accordance with a reporting configuration. In one example, transmitting the indication of at least the first signal quality includes including in the indication one or more of the measured signal qualities for each of one or more of the set of subbands. Here, each of the one or more of the measured signal qualities associated with an individual subband of the one or more of the set of subbands corresponding to different ones of the set of transmit beams. Additionally, the UE 115-*b* may identify (e.g., based on the reporting configuration indicated at 305 or selected at 310) a first quantity of the set of transmit beams for which the measured signal qualities are to be reported for each of the one or more of the set of subbands, where a number of the one or more of the measured signal qualities included in the indication for each of the one or more of the set of subbands is less than or equal to the first quantity of the set of transmit beams. In some cases, the first quantity may be subband-specific. Additionally, the UE 115-*b* may select the one or more of the measured signal qualities included in the indication for each of the one or more of the set of subbands based on respective strengths of the measured signal qualities of each of the set of reference signals.

In another example, the UE 115-*b* may include, in the indication of at least the first signal quality, one or more of the measured signal qualities for each of one or more of the set of transmit beams. Here, each of the one or more of the measured signal qualities may be associated with an individual transmit beam of the one or more of the set of transmit beams corresponding to different ones of the set of subbands. Additionally, the UE 115-*b* may identify (e.g., based on the reporting configuration indicated at 305 or selected at 310) a first quantity of the set of subbands for which the measured signal qualities are to be reported for each of the one or more of the set of transmit beams. Here, a number of the one or more of the measured signal qualities included in the indication for each of the one or more of the set of transmit beams is less than or equal to the first quantity of the set of subbands. In some cases, the value of the first quantity may be transmit beam-specific. Additionally, the UE 115-*b* may select the one or more of the measured signal qualities included in the indication for each of the one or more of the set of transmit beams based on respective strengths of the measured signal qualities of each of the set of reference signals.

In another example, the UE 115-*b* may include, in the indication of at least the first signal quality, one or more of the measured signal qualities for each of one or more pairs of subbands and transmit beams from the set of subbands and transmit beams from the set of transmit beams. Here, the UE 115-*b* may transmit, to the base station 105-*b*, indices of the one or more pairs selected from the multiple pairs.

At 330, the UE 115-*b* and base station 105-*b* may communicate via transmissions over the first subband and the first transmit beam based on the UE 115-*b* transmitting the indication of at least a first signal quality associated with a first subband of the set of subbands and a first transmit beam of the set of transmit beams.

Figure 4:
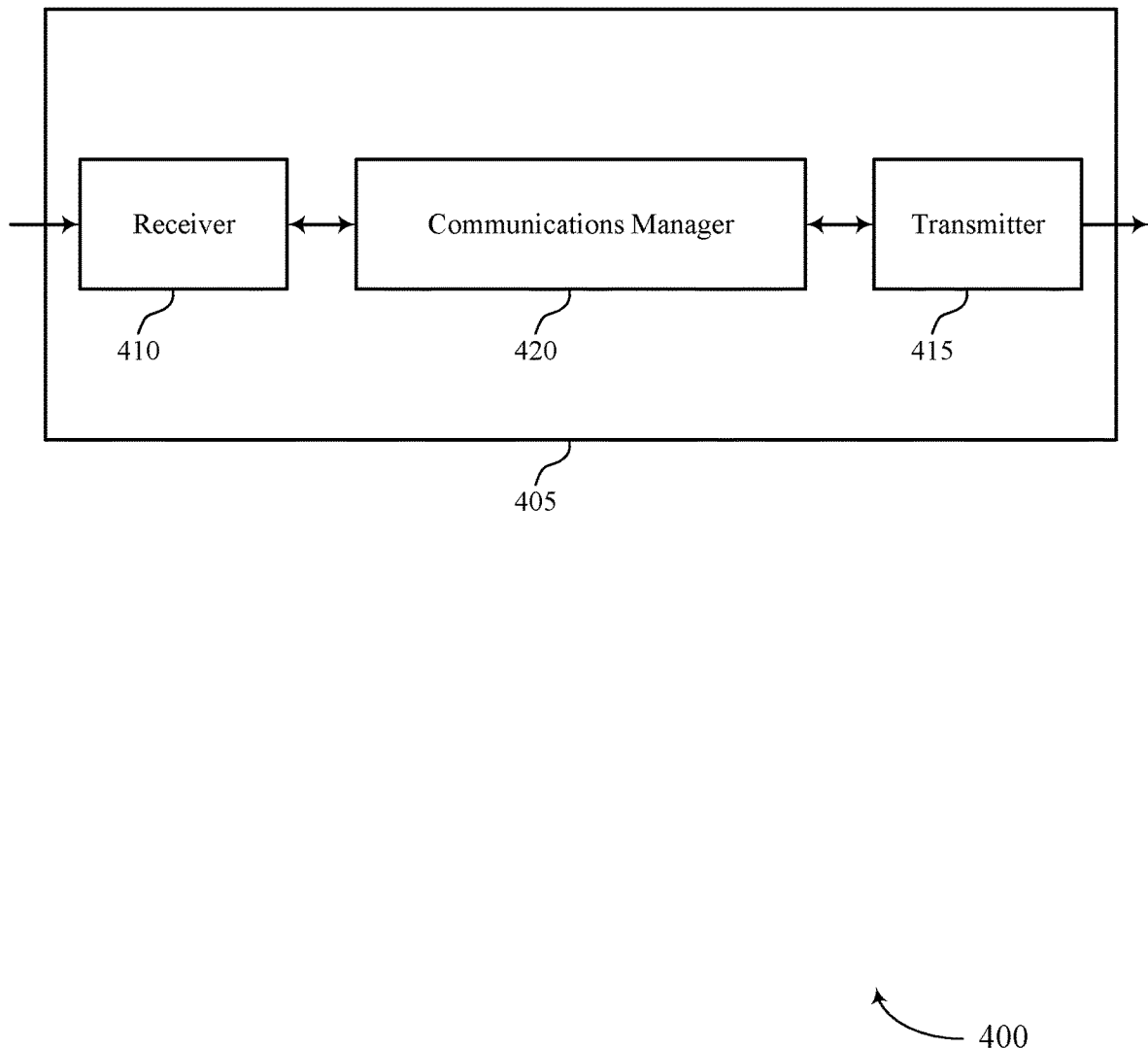
FIGS. 4 and 5 show block diagrams of devices that support subband reference signal measurements in accordance with aspects of the present disclosure.

FIG. 4 shows a block diagram 400 of a device 405 that supports subband reference signal measurements in accordance with aspects of the present disclosure. The device 405 may be an example of aspects of a UE 115 as described herein. The device 405 may include a receiver 410, a transmitter 415, and a communications manager 420. The device 405 may one or more processors, memory coupled with the one or more processors, and instructions stored in the memory that are executable by the one or more processors to enable the one or more processors to perform the subband reference signal measurement features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to subband reference signal measurements). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to subband reference signal measurements). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of subband reference signal measurements as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving a set of reference signals from a base station, each of the set of reference signals spanning a channel and associated with one of a set of transmit beams from the base station. The communications manager 420 may be configured as or otherwise support a means for measuring a signal quality of each of the set of reference signals, each measured signal quality corresponding to one of a set of multiple subbands of the channel. The communications manager 420 may be configured as or otherwise support a means for transmitting, to the base station, an indication of at least a first signal quality associated with a first subband of the set of multiple subbands and a first transmit beam of the set of transmit beams.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more reliable communications by enabling measurement reporting for subbands.

Figure 5:
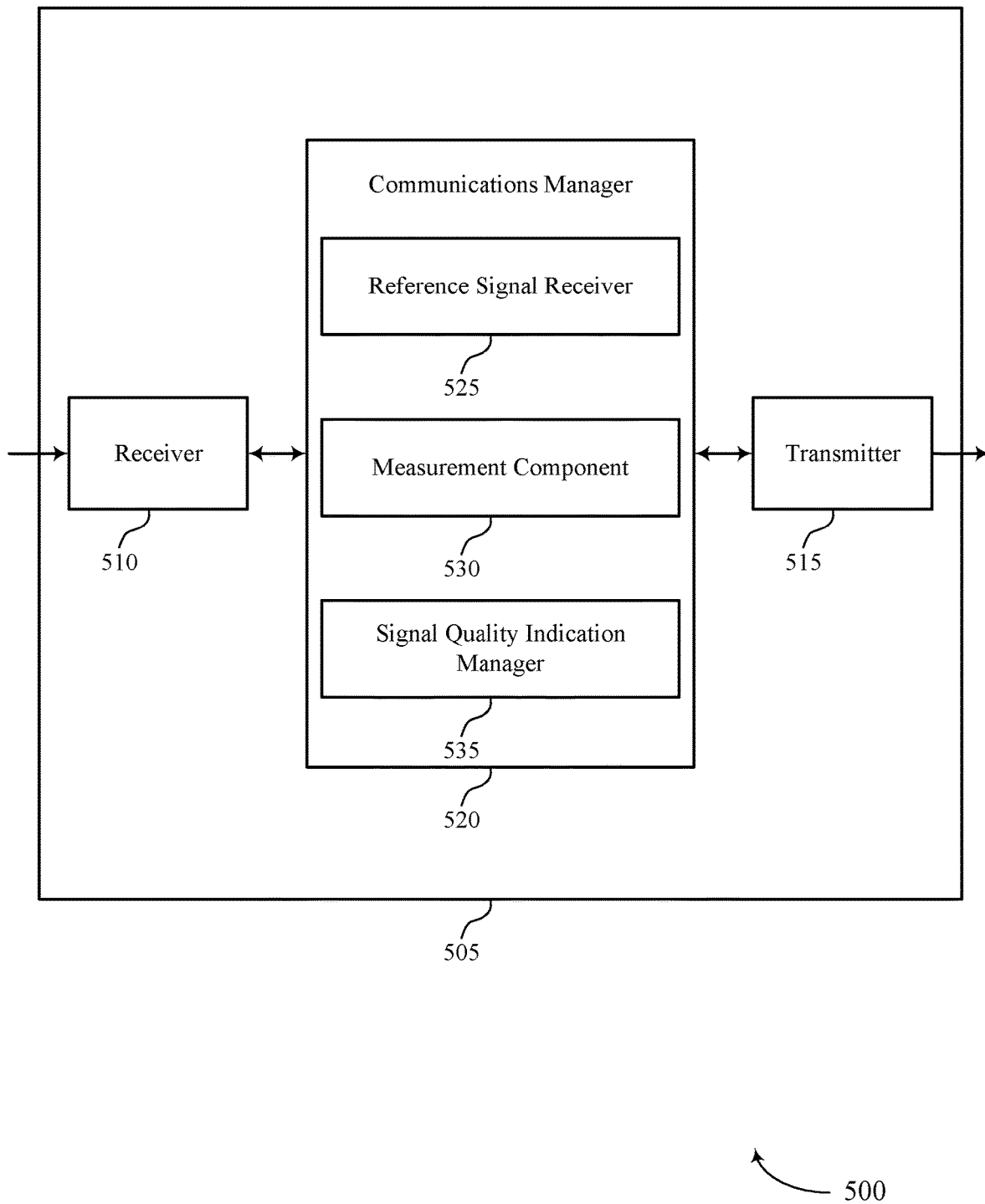

FIG. 5 shows a block diagram 500 of a device 505 that supports subband reference signal measurements in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to subband reference signal measurements). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to subband reference signal measurements). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of subband reference signal measurements as described herein. For example, the communications manager 520 may include a reference signal receiver 525, a measurement component 530, a signal quality indication manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The reference signal receiver 525 may be configured as or otherwise support a means for receiving a set of reference signals from a base station, each of the set of reference signals spanning a channel and associated with one of a set of transmit beams from the base station. The measurement component 530 may be configured as or otherwise support a means for measuring a signal quality of each of the set of reference signals, each measured signal quality corresponding to one of a set of multiple subbands of the channel. The signal quality indication manager 535 may be configured as or otherwise support a means for transmitting, to the base station, an indication of at least a first signal quality associated with a first subband of the set of multiple subbands and a first transmit beam of the set of transmit beams.

In some cases, the reference signal receiver 525, measurement component 530, and signal quality indication manager 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal receiver 525, measurement component 530, and signal quality indication manager 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 6:
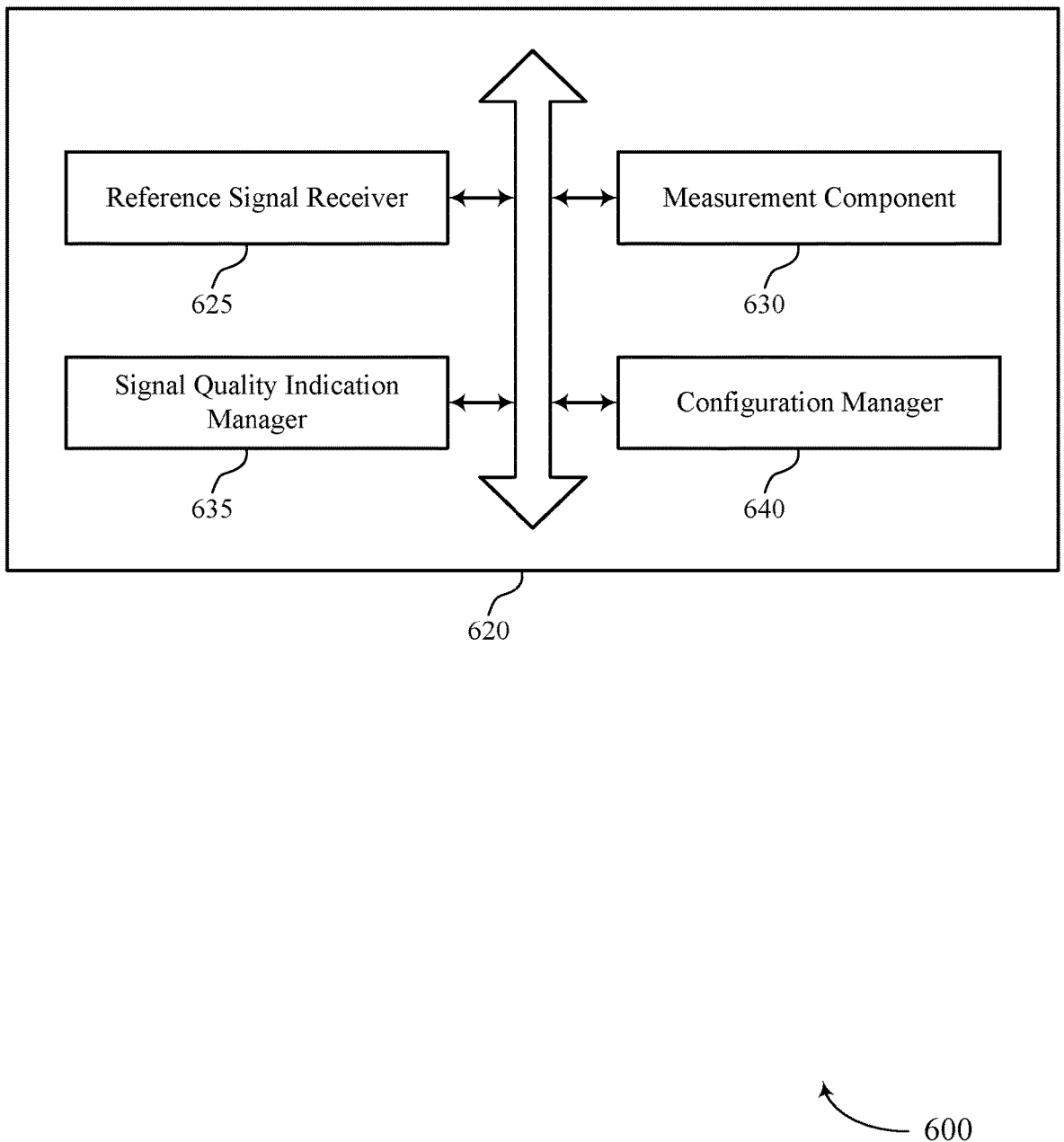
FIG. 6 shows a block diagram of a communications manager that supports subband reference signal measurements in accordance with aspects of the present disclosure.

FIG. 6 shows a block diagram 600 of a communications manager 620 that supports subband reference signal measurements in accordance with aspects of the present disclosure. The communications manager 620 may be an example of aspects of a communications manager 420, a communications manager 520, or both, as described herein. The communications manager 620, or various components thereof, may be an example of means for performing various aspects of subband reference signal measurements as described herein. For example, the communications manager 620 may include a reference signal receiver 625, a measurement component 630, a signal quality indication manager 635, a configuration manager 640, or any combination thereof. Each of these components may communicate, directly or indirectly, with one another (e.g., via one or more buses).

The communications manager 620 may support wireless communications at a UE in accordance with examples as disclosed herein. The reference signal receiver 625 may be configured as or otherwise support a means for receiving a set of reference signals from a base station, each of the set of reference signals spanning a channel and associated with one of a set of transmit beams from the base station. The measurement component 630 may be configured as or otherwise support a means for measuring a signal quality of each of the set of reference signals, each measured signal quality corresponding to one of a set of multiple subbands of the channel. The signal quality indication manager 635 may be configured as or otherwise support a means for transmitting, to the base station, an indication of at least a first signal quality associated with a first subband of the set of multiple subbands and a first transmit beam of the set of transmit beams.

In some examples, the configuration manager 640 may be configured as or otherwise support a means for receiving, from the base station, a configuration which identifies one or more subbands of the channel for which the UE is to obtain and transmit the measured signal qualities.

In some cases, the configuration manager 640 may be configured as or otherwise support a means for selecting, at the UE, one or more subbands of the channel for which the UE is to obtain and transmit the measured signal qualities.

In some instances, to support transmitting the indication of at least the first signal quality associated with the first subband and the first transmit beam, the signal quality indication manager 635 may be configured as or otherwise support a means for including in the indication one or more of the measured signal qualities for each of one or more of the set of multiple subbands, each of the one or more of the measured signal qualities associated with an individual subband of the one or more of the set of multiple subbands corresponding to different ones of the set of transmit beams.

In some examples, the configuration manager 640 may be configured as or otherwise support a means for identifying a first quantity of the set of transmit beams for which the measured signal qualities are to be reported for each of the one or more of the set of multiple subbands, where a number of the one or more of the measured signal qualities included in the indication for each of the one or more of the set of multiple subbands is less than or equal to the first quantity of the set of transmit beams.

In some cases, to support identifying the first quantity of the set of transmit beams for which the measured signal qualities are to be reported, the configuration manager 640 may be configured as or otherwise support a means for receiving an indicator of the first quantity from the base station.

In some instances, to support identifying the first quantity of the set of transmit beams for which the measured signal qualities are to be reported, the configuration manager 640 may be configured as or otherwise support a means for selecting a value of the first quantity at the UE.

In some examples, the signal quality indication manager 635 may be configured as or otherwise support a means for reporting to the base station the selected value of the first quantity. In some examples, a value of the first quantity is subband-specific.

In some cases, the configuration manager 640 may be configured as or otherwise support a means for selecting the one or more of the measured signal qualities included in the indication for each of the one or more of the set of multiple subbands based on respective strengths of the measured signal qualities of each of the set of reference signals.

In some instances, to support transmitting the indication of at least the first signal quality associated with the first subband and the first transmit beam, the signal quality indication manager 635 may be configured as or otherwise support a means for including in the indication one or more of the measured signal qualities for each of one or more of the set of transmit beams, each of the one or more of the measured signal qualities associated with an individual transmit beam of the one or more of the set of transmit beams corresponding to different ones of the set of multiple subbands.

In some examples, the configuration manager 640 may be configured as or otherwise support a means for identifying a first quantity of the set of multiple subbands for which the measured signal qualities are to be reported for each of the one or more of the set of transmit beams, where a number of the one or more of the measured signal qualities included in the indication for each of the one or more of the set of transmit beams is less than or equal to the first quantity of the set of multiple subbands.

In some cases, to support identifying the first quantity of the set of multiple subbands for which the measured signal qualities are to be reported, the configuration manager 640 may be configured as or otherwise support a means for receiving an indicator of the first quantity from the base station.

In some instances, to support identifying the first quantity of the set of multiple subbands for which the measured signal qualities are to be reported, the configuration manager 640 may be configured as or otherwise support a means for selecting a value of the first quantity at the UE.

In some examples, the signal quality indication manager 635 may be configured as or otherwise support a means for reporting to the base station the selected value of the first quantity. In some cases, a value of the first quantity is transmit beam-specific.

In some instances, the configuration manager 640 may be configured as or otherwise support a means for selecting the one or more of the measured signal qualities included in the indication for each of the one or more of the set of transmit beams based on respective strengths of the measured signal qualities of each of the set of reference signals.

In some examples, to support transmitting the indication of at least the first signal quality associated with the first subband and the first transmit beam, the signal quality indication manager 635 may be configured as or otherwise support a means for including in the indication one or more of the measured signal qualities for each of one or more pairs of subbands and transmit beams from the set of multiple subbands and transmit beams from the set of transmit beams.

In some cases, the configuration manager 640 may be configured as or otherwise support a means for receiving, from the base station, an indicator of multiple pairs of subbands and transmit beams from which the one or more pairs are selected. In some examples, the configuration manager 640 may be configured as or otherwise support a means for receiving, from the base station, a first quantity of the multiple pairs of subbands and transmit beams for which the UE is to include corresponding measured signal qualities in the indication transmitted to the base station, the first quantity being equal to a number of the one or more pairs. In some instances, the signal quality indication manager 635 may be configured as or otherwise support a means for transmitting, to the base station, indices of the one or more pairs selected from the multiple pairs.

In some examples, a first size of the first subband of the set of multiple subbands is different than a second size of a second subband of the set of multiple subbands. In some cases, the set of reference signals include SSBs, CSI-RSs, or a combination thereof. In some instances, the indication of at least the first signal quality includes an indicator of an RSRP associated with the first subband and the first transmit beam.

In some cases, the reference signal receiver 625, measurement component 630, signal quality indication manager 635, and configuration manager 640 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal receiver 625, measurement component 630, signal quality indication manager 635, and configuration manager 640 discussed herein.

Figure 7:
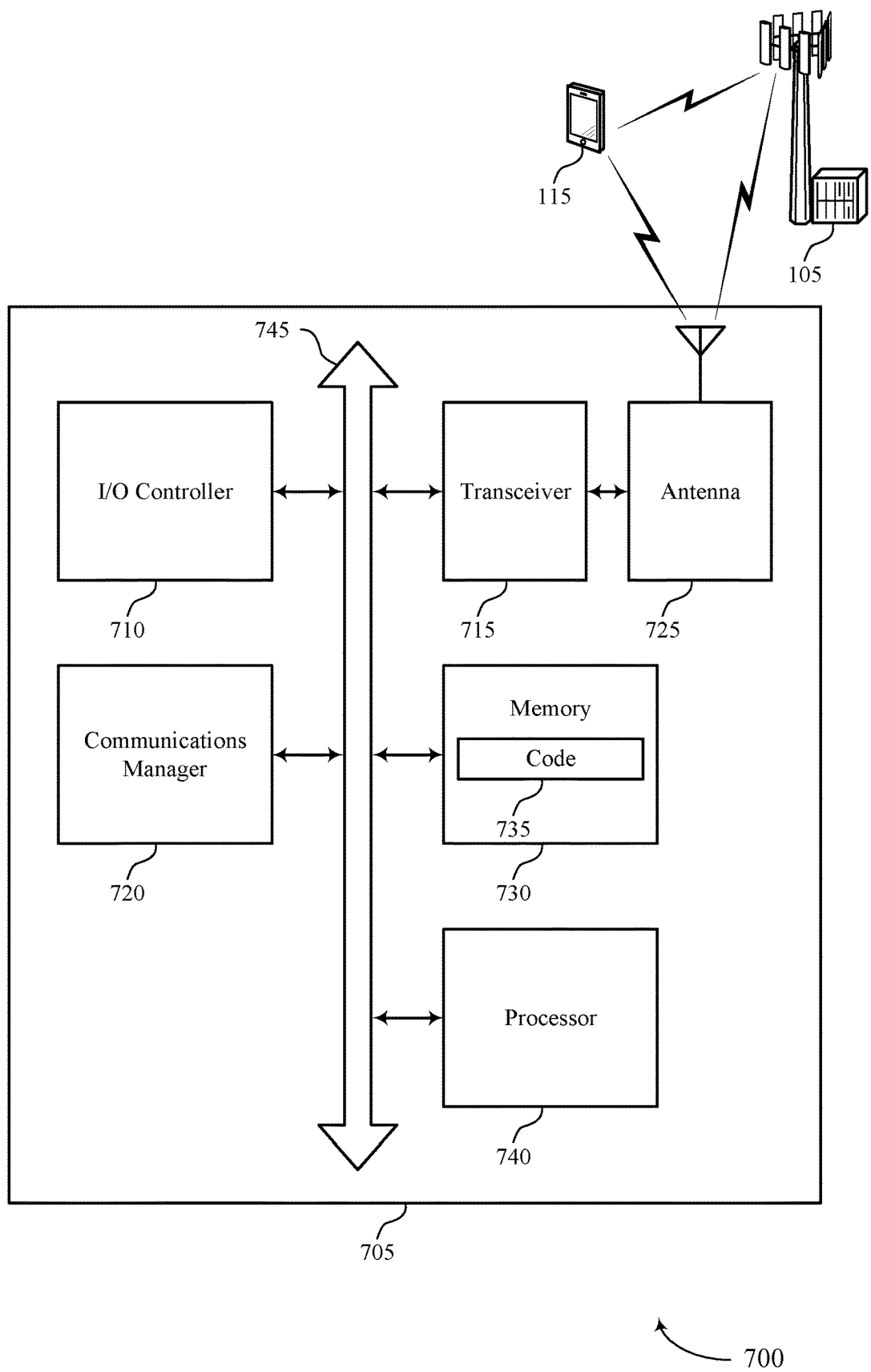
FIG. 7 shows a diagram of a system including a device that supports subband reference signal measurements in accordance with aspects of the present disclosure.

FIG. 7 shows a diagram of a system 700 including a device 705 that supports subband reference signal measurements in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting subband reference signal measurements). For example, the device 705 or a component of the device 705 may include a processor 740 and memory 730 coupled to the processor

740, the processor 740 and memory 730 configured to perform various functions described herein.

The communications manager 720 may support wireless communications at a UE in accordance with examples as disclosed herein. For example, the communications manager 720 may be configured as or otherwise support a means for receiving a set of reference signals from a base station, each of the set of reference signals spanning a channel and associated with one of a set of transmit beams from the base station. The communications manager 720 may be configured as or otherwise support a means for measuring a signal quality of each of the set of reference signals, each measured signal quality corresponding to one of a set of multiple subbands of the channel. The communications manager 720 may be configured as or otherwise support a means for transmitting, to the base station, an indication of at least a first signal quality associated with a first subband of the set of multiple subbands and a first transmit beam of the set of transmit beams.

By including or configuring the communications manager 720 in accordance with examples as described herein, the device 705 may support techniques improved communications reliability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of subband reference signal measurements as described herein, or the processor 740 and the memory 730 may be otherwise configured to perform or support such operations.

Figure 8:
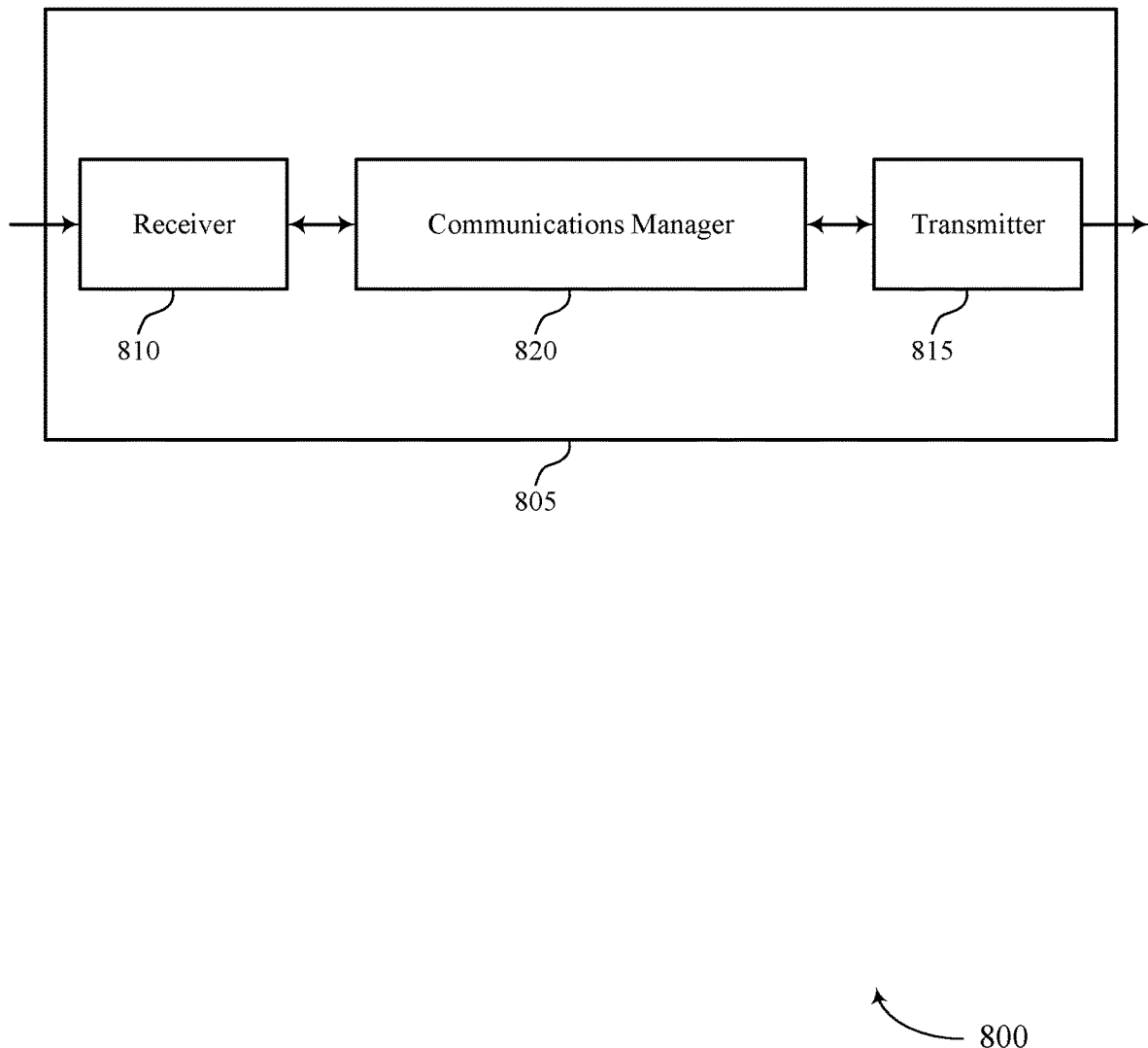
FIGS. 8 and 9 show block diagrams of devices that support subband reference signal measurements in accordance with aspects of the present disclosure.

FIG. 8 shows a block diagram 800 of a device 805 that supports subband reference signal measurements in accordance with aspects of the present disclosure. The device 805 may be an example of aspects of a base station 105 as described herein. The device 805 may include a receiver 810, a transmitter 815, and a communications manager 820. The device 805 may also include one or more processors, memory coupled with the one or more processors, and instructions stored in the memory that are executable by the one or more processors to enable the one or more processors to perform the subband reference signal measurement features discussed herein. Each of these components may be in communication with one another (e.g., via one or more buses).

The receiver 810 may provide a means for receiving information such as packets, user data, control information, or any combination thereof associated with various information channels (e.g., control channels, data channels, information channels related to subband reference signal measurements). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to subband reference signal measurements). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of subband reference signal measurements as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting a set of reference signals to a UE, each of the set of reference signals spanning a channel and associated with one of a set of transmit beams from the base station. The communications manager 820 may be configured as or otherwise support a means for receiving, from the UE and in response to transmission of the set of reference signals, an indication of at least a first signal quality associated with a first subband of a set of multiple subbands that together span the channel and a first transmit beam of the base station. The communications manager 820 may be configured as or otherwise support a means for communicating with the UE via transmissions over the first subband and the first transmit beam based on receiving the indication.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more reliable communications by enabling measurement reporting for subbands.

Figure 9:
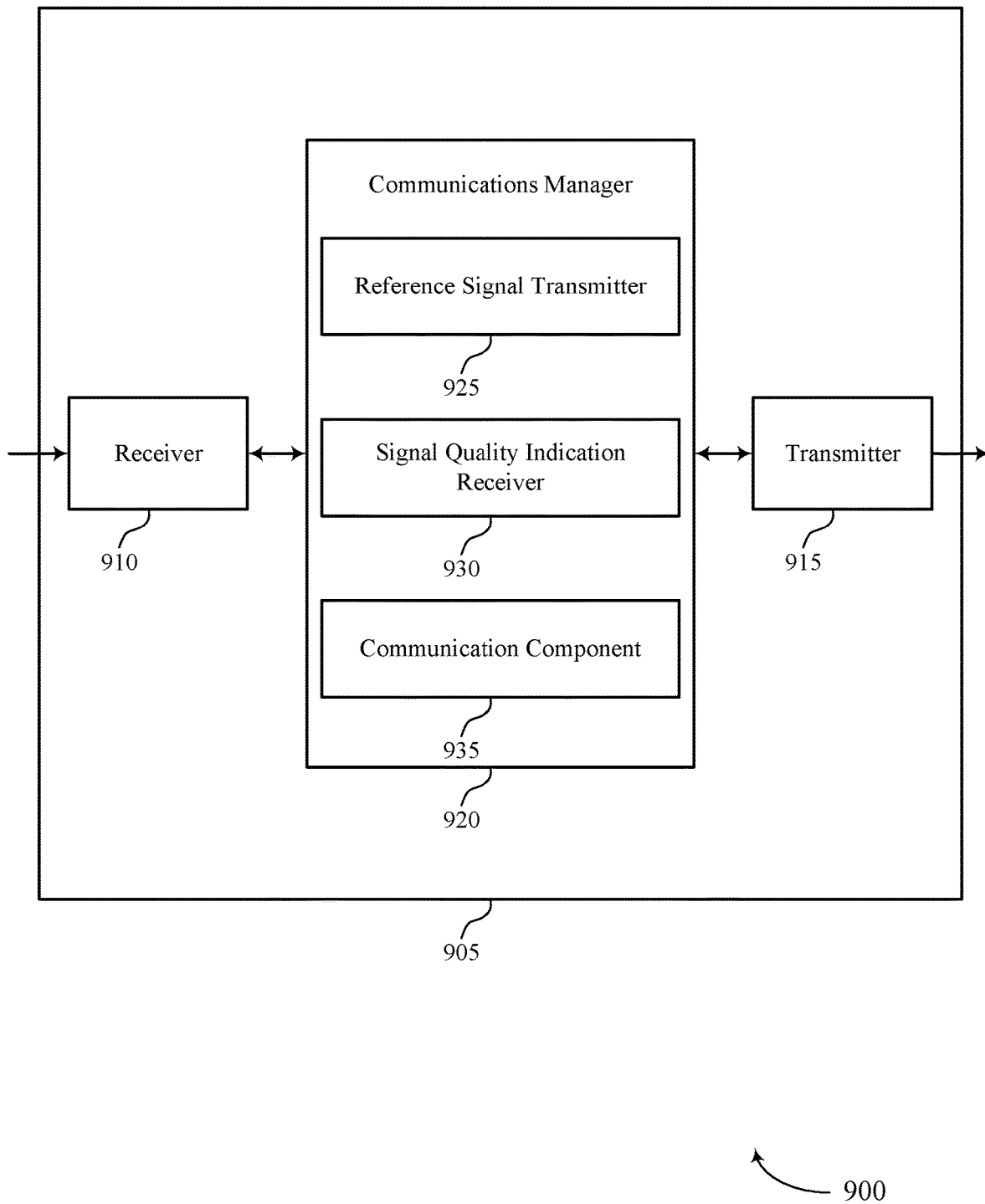

FIG. 9 shows a block diagram 900 of a device 905 that supports subband reference signal measurements in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to subband reference signal measurements). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to subband reference signal measurements). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of subband reference signal measurements as described herein. For example, the communications manager 920 may include a reference signal transmitter 925, a signal quality indication receiver 930, a communication component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The reference signal transmitter 925 may be configured as or otherwise support a means for transmitting a set of reference signals to a UE, each of the set of reference signals spanning a channel and associated with one of a set of transmit beams from the base station. The signal quality indication receiver 930 may be configured as or otherwise support a means for receiving, from the UE and in response to transmission of the set of reference signals, an indication of at least a first signal quality associated with a first subband of a set of multiple subbands that together span the channel and a first transmit beam of the base station. The communication component 935 may be configured as or otherwise support a means for communicating with the UE via transmissions over the first subband and the first transmit beam based on receiving the indication.

In some cases, the reference signal transmitter 925, signal quality indication receiver 930, and communication component 935 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal transmitter 925, signal quality indication receiver 930, and communication component 935 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
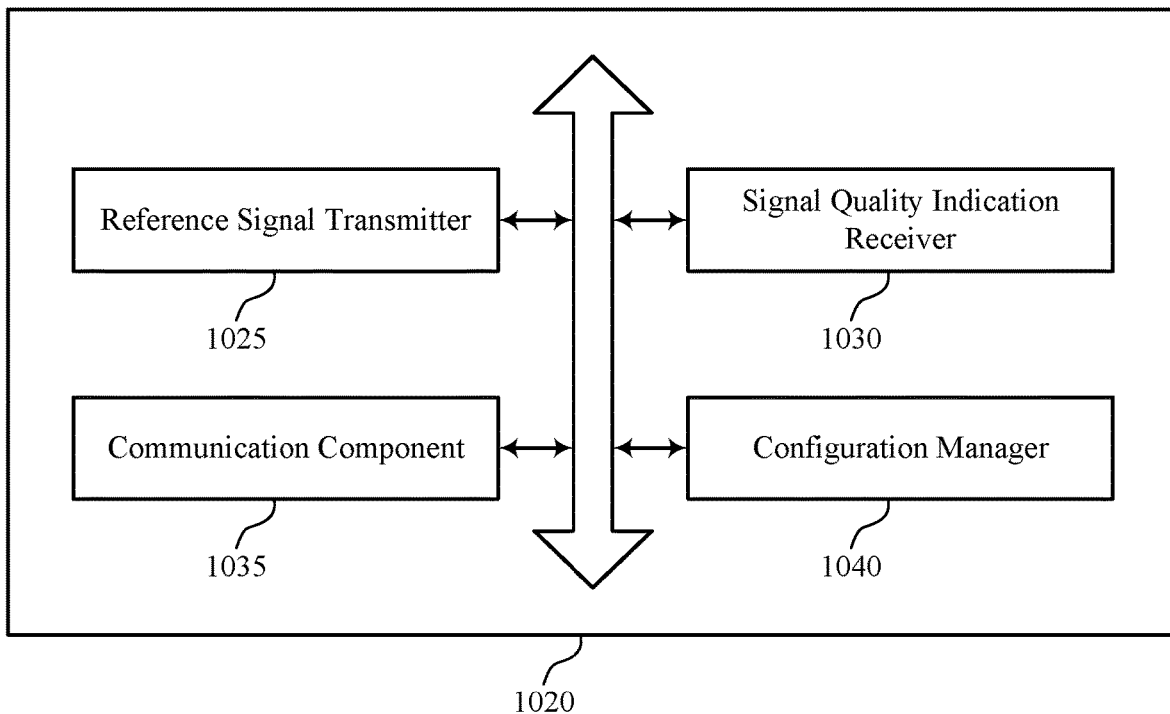
FIG. 10 shows a block diagram of a communications manager that supports subband reference signal measurements in accordance with aspects of the present disclosure.

FIG. 10 shows a block diagram 1000 of a communications manager 1020 that supports subband reference signal measurements in accordance with aspects of the present disclosure. The communications manager 1020 may be an example of aspects of a communications manager 820, a communications manager 920, or both, as described herein. The communications manager 1020, or various components thereof, may be an example of means for performing various aspects of subband reference signal measurements as described herein. For example, the communications manager 1020 may include a reference signal transmitter 1025, a signal quality indication receiver 1030, a communication component 1035, a configuration manager 1040, or any combination thereof. Each of these components may communicate, directly or indirectly, with one another (e.g., via one or more buses).

The communications manager 1020 may support wireless communications at a base station in accordance with examples as disclosed herein. The reference signal transmitter 1025 may be configured as or otherwise support a means for transmitting a set of reference signals to a UE, each of the set of reference signals spanning a channel and associated with one of a set of transmit beams from the base station. The signal quality indication receiver 1030 may be configured as or otherwise support a means for receiving, from the UE and in response to transmission of the set of reference signals, an indication of at least a first signal quality associated with a first subband of a set of multiple subbands that together span the channel and a first transmit beam of the base station. The communication component 1035 may be configured as or otherwise support a means for communicating with the UE via transmissions over the first subband and the first transmit beam based on receiving the indication.

In some examples, the configuration manager 1040 may be configured as or otherwise support a means for transmitting, to the UE, a configuration which identifies one or more subbands of the channel for which the UE is to measure signal qualities, including the first subband.

In some cases, to support receiving the indication of at least the first signal quality associated with the first subband and the first transmit beam, the signal quality indication receiver 1030 may be configured as or otherwise support a means for receiving in the indication one or more measured signal qualities for each of one or more of the set of multiple subbands, each of the one or more measured signal qualities associated with an individual subband of the one or more of the set of multiple subbands corresponding to different ones of the set of transmit beams.

In some instances, the configuration manager 1040 may be configured as or otherwise support a means for identifying a first quantity of the set of transmit beams for which the measured signal qualities are to be reported for each of the one or more of the set of multiple subbands, where a number of the one or more measured signal qualities included in the indication for each of the one or more of the set of multiple subbands is less than or equal to the first quantity of the set of transmit beams.

In some examples, to support identifying the first quantity of the set of transmit beams for which the measured signal qualities are to be reported, the configuration manager 1040 may be configured as or otherwise support a means for transmitting an indicator of the first quantity to the UE.

In some cases, to support identifying the first quantity of the set of transmit beams for which the measured signal qualities are to be reported, the configuration manager 1040 may be configured as or otherwise support a means for receiving a report from the UE of a UE-selected value of the first quantity. In some instances, a value of the first quantity is subband-specific.

In some examples, to support receiving the indication of at least the first signal quality associated with the first subband and the first transmit beam, the signal quality indication receiver 1030 may be configured as or otherwise support a means for receiving in the indication one or more measured signal qualities for each of one or more of the set of transmit beams, each of the one or more measured signal qualities associated with an individual transmit beam of the one or more of the set of transmit beams corresponding to different ones of the set of multiple subbands.

In some cases, the configuration manager 1040 may be configured as or otherwise support a means for identifying a first quantity of the set of multiple subbands for which the measured signal qualities are to be reported for each of the one or more of the set of transmit beams, where a number of the one or more measured signal qualities included in the indication for each of the one or more of the set of transmit beams is less than or equal to the first quantity of the set of multiple subbands.

In some instances, to support identifying the first quantity of the set of multiple subbands for which the measured signal qualities are to be reported, the configuration manager 1040 may be configured as or otherwise support a means for transmitting an indicator of the first quantity to the UE.

In some examples, to support identifying the first quantity of the set of multiple subbands for which the measured signal qualities are to be reported, the configuration manager 1040 may be configured as or otherwise support a means for receiving a report from the UE indicating a UE-selected value of the first quantity. In some cases, a value of the first quantity is transmit beam-specific.

In some instances, to support receiving the indication of at least the first signal quality associated with the first subband and the first transmit beam, the signal quality indication receiver 1030 may be configured as or otherwise support a means for receiving in the indication one or more measured signal qualities for each of one or more pairs of subbands and transmit beams from the set of multiple subbands and transmit beams from the set of transmit beams.

In some examples, the configuration manager 1040 may be configured as or otherwise support a means for transmitting, to the UE, an indicator of multiple pairs of subbands and transmit beams from which the one or more pairs are selected. In some examples, the configuration manager 1040 may be configured as or otherwise support a means for transmitting, to the UE, a first quantity of the multiple pairs of subbands and transmit beams for which the UE is to include corresponding measured signal qualities in the indication transmitted to the base station, the first quantity being equal to a number of the one or more pairs. In some cases, the signal quality indication receiver 1030 may be configured as or otherwise support a means for receiving, from the UE, indices of the one or more pairs selected by the UE from the multiple pairs.

In some examples, a first size of the first subband of the set of multiple subbands is different than a second size of a second subband of the set of multiple subbands. In some cases, the set of reference signals include SSBs, CSI-RSs, or a combination thereof. In some instances, the indication of at least the first signal quality includes an indicator of an RSRP associated with the first subband and the first transmit beam.

In some cases, the reference signal transmitter 1025, signal quality indication receiver 1030, communication component 1035, and configuration manager 1040 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal transmitter 1025, signal quality indication receiver 1030, communication component 1035, and configuration manager 1040 discussed herein.

Figure 11:
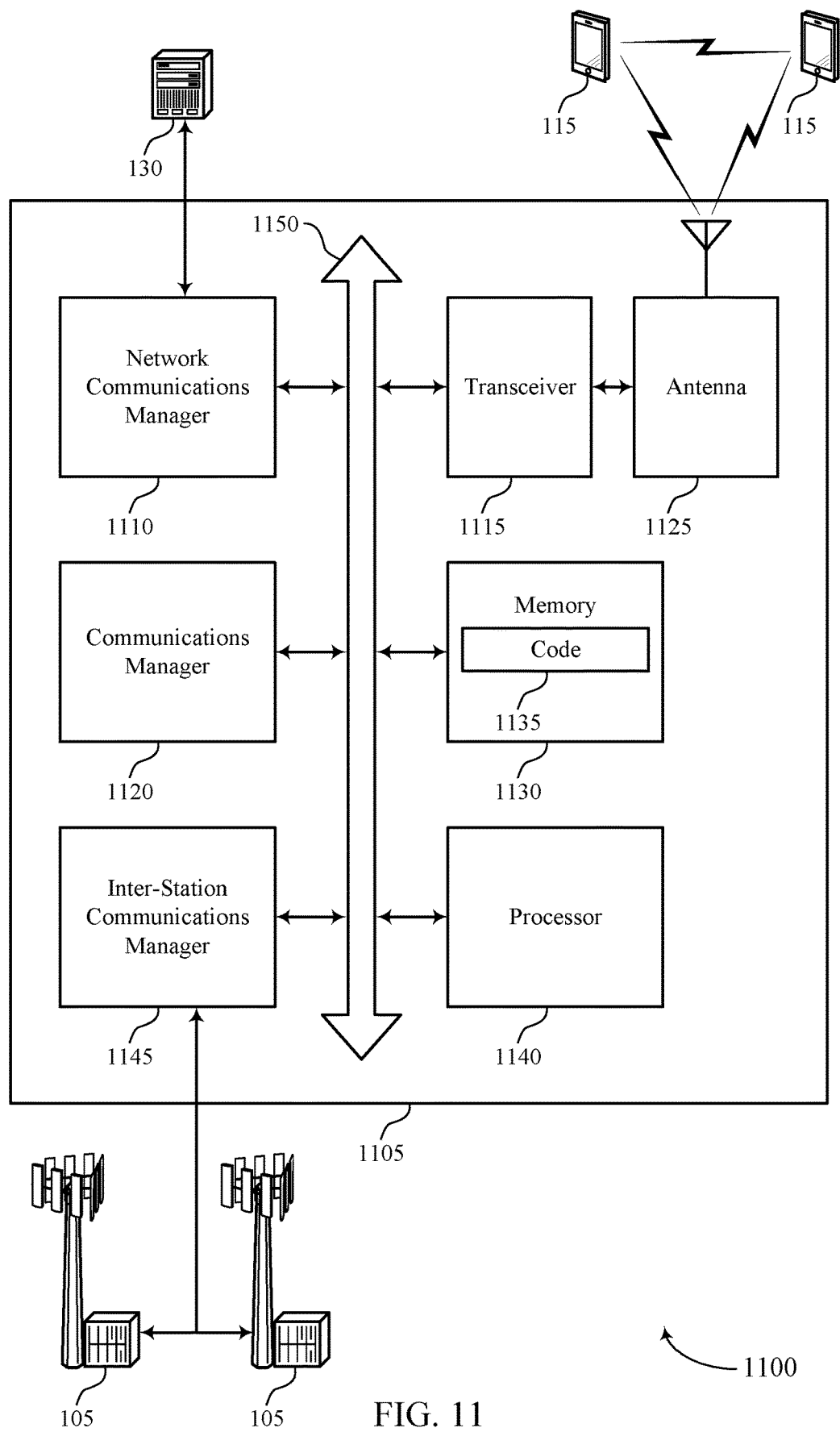
FIG. 11 shows a diagram of a system including a device that supports subband reference signal measurements in accordance with aspects of the present disclosure.

FIG. 11 shows a diagram of a system 1100 including a device 1105 that supports subband reference signal measurements in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting subband reference signal measurements). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting a set of reference signals to a UE, each of the set of reference signals spanning a channel and associated with one of a set of transmit beams from the base station. The communications manager 1120 may be configured as or otherwise support a means for receiving, from the UE and in response to transmission of the set of reference signals, an indication of at least a first signal quality associated with a first subband of a set of multiple subbands that together span the channel and a first transmit beam of the base station. The communications manager 1120 may be configured as or otherwise support a means for communicating with the UE via transmissions over the first subband and the first transmit beam based on receiving the indication.

By including or configuring the communications manager 1120 in accordance with examples as described herein, the device 1105 may support techniques for improved communication reliability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of subband reference signal measurements as described herein, or the processor 1140 and the memory 1130 may be otherwise configured to perform or support such operations.

Figure 12:
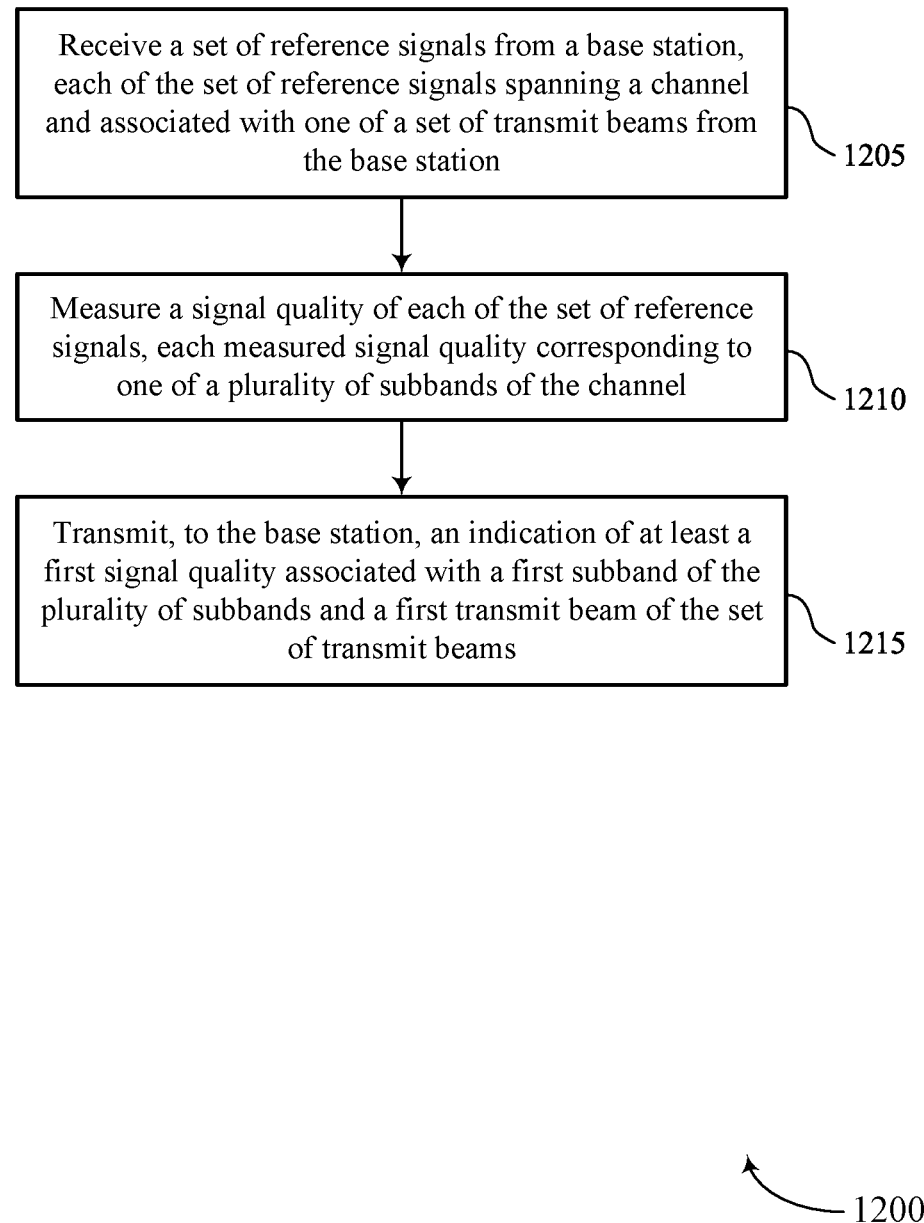
FIGS. 12 through 16 show flowcharts illustrating methods that support subband reference signal measurements in accordance with aspects of the present disclosure.

FIG. 12 shows a flowchart illustrating a method 1200 that supports subband reference signal measurements in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving a set of reference signals from a base station, each of the set of reference signals spanning a channel and associated with one of a set of transmit beams from the base station. The operations of 1205 may be performed in accordance with examples as disclosed herein. In some examples, aspects of the operations of 1205 may be performed by a reference signal receiver 625 as described with reference to FIG. 6.

At 1210, the method may include measuring a signal quality of each of the set of reference signals, each measured signal quality corresponding to one of a set of multiple subbands of the channel. The operations of 1210 may be performed in accordance with examples as disclosed herein. In some examples, aspects of the operations of 1210 may be performed by a measurement component 630 as described with reference to FIG. 6.

At 1215, the method may include transmitting, to the base station, an indication of at least a first signal quality associated with a first subband of the set of multiple subbands and a first transmit beam of the set of transmit beams. The operations of 1215 may be performed in accordance with examples as disclosed herein. In some examples, aspects of the operations of 1215 may be performed by a signal quality indication manager 635 as described with reference to FIG. 6.

Figure 13:
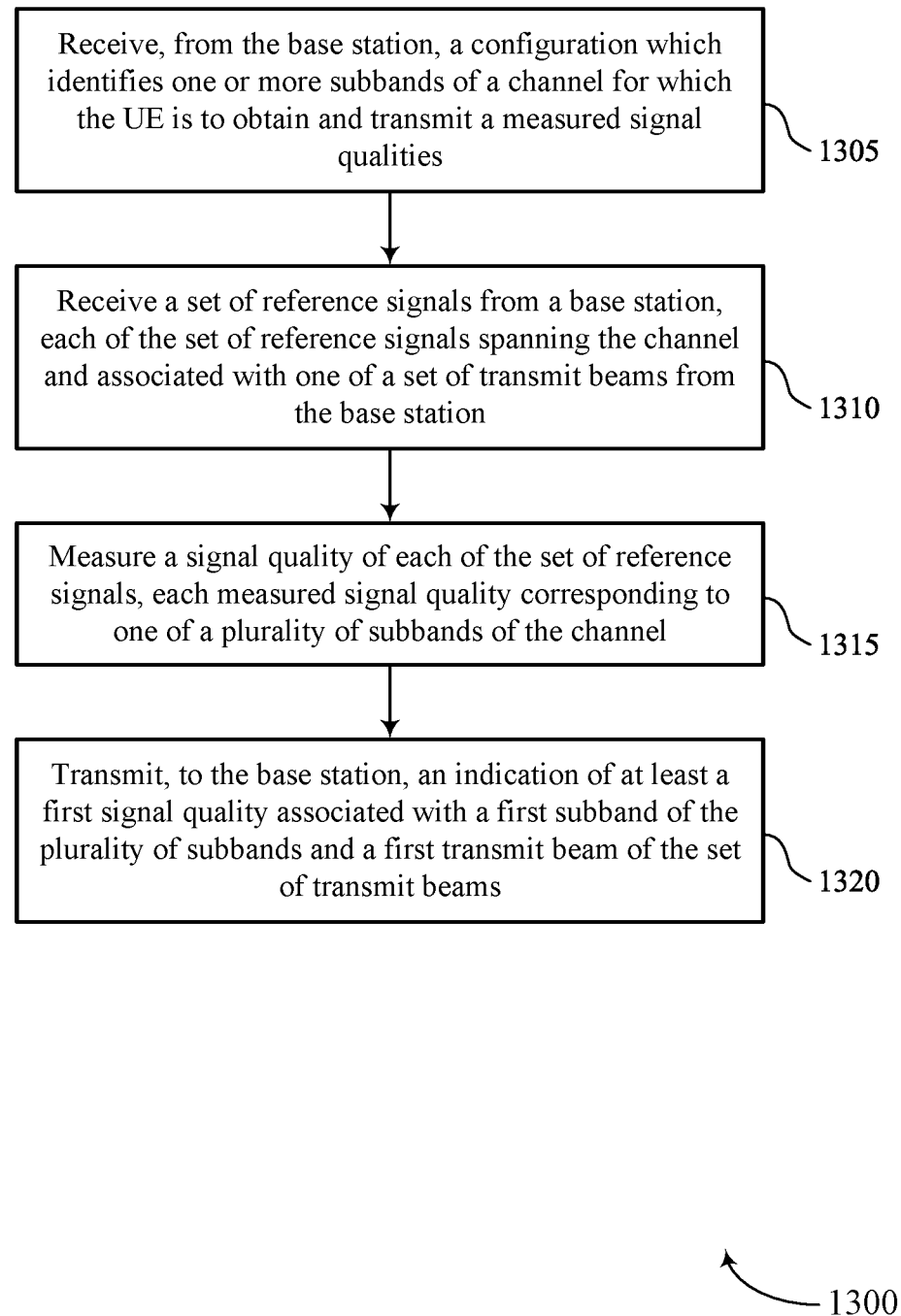

FIG. 13 shows a flowchart illustrating a method 1300 that supports subband reference signal measurements in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from the base station, a configuration which identifies one or more subbands of the channel for which the UE is to obtain and transmit the measured signal qualities. The operations of 1305 may be performed in accordance with examples as disclosed herein. In some examples, aspects of the operations of 1305 may be performed by a configuration manager 640 as described with reference to FIG. 6.

At 1310, the method may include receiving a set of reference signals from a base station, each of the set of reference signals spanning a channel and associated with one of a set of transmit beams from the base station. The operations of 1310 may be performed in accordance with examples as disclosed herein. In some examples, aspects of the operations of 1310 may be performed by a reference signal receiver 625 as described with reference to FIG. 6.

At 1315, the method may include measuring a signal quality of each of the set of reference signals, each measured signal quality corresponding to one of a set of multiple subbands of the channel. The operations of 1315 may be performed in accordance with examples as disclosed herein. In some examples, aspects of the operations of 1315 may be performed by a measurement component 630 as described with reference to FIG. 6.

At 1320, the method may include transmitting, to the base station, an indication of at least a first signal quality associated with a first subband of the set of multiple subbands and a first transmit beam of the set of transmit beams. The operations of 1320 may be performed in accordance with examples as disclosed herein. In some examples, aspects of the operations of 1320 may be performed by a signal quality indication manager 635 as described with reference to FIG. 6.

Figure 14:
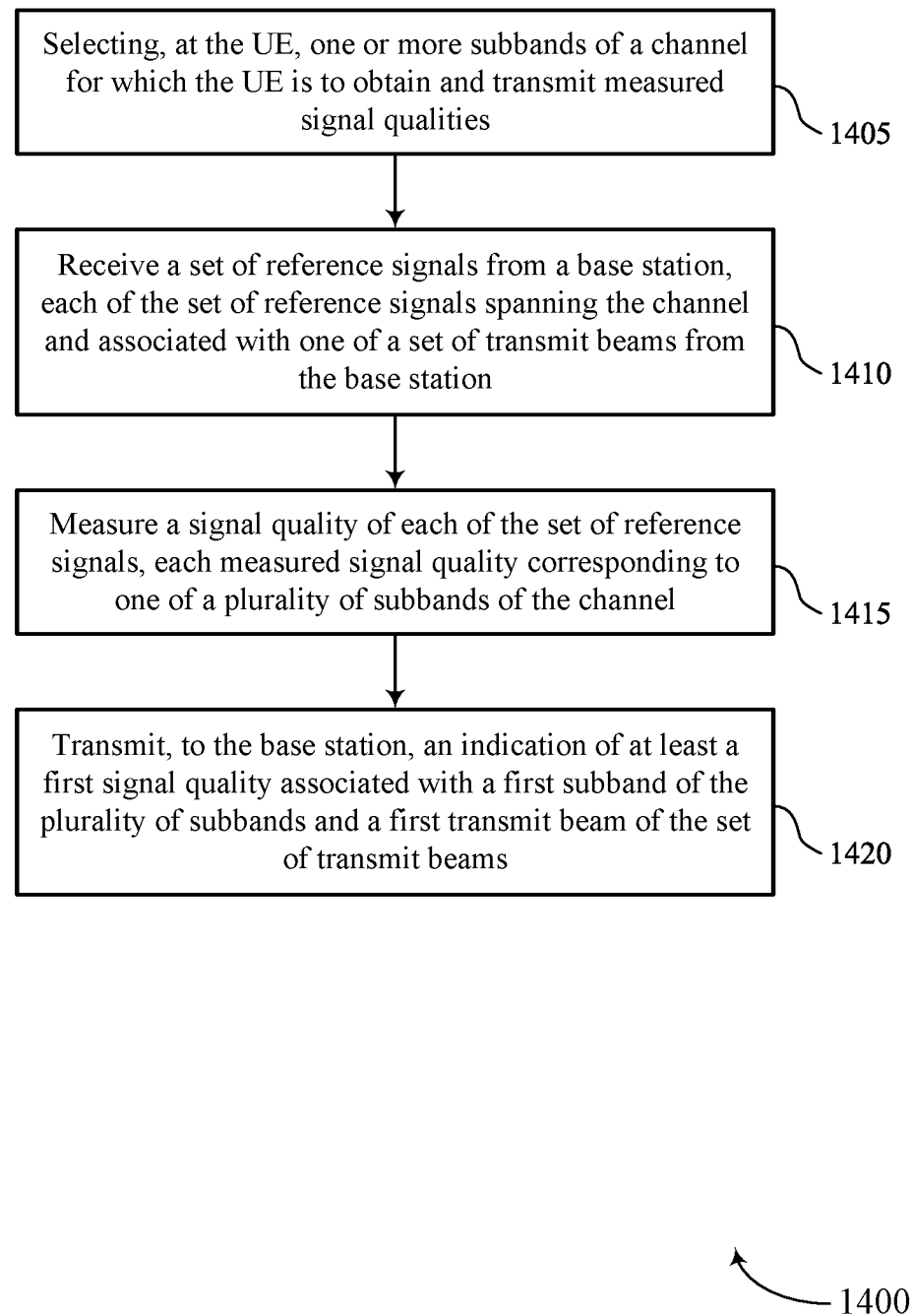

FIG. 14 shows a flowchart illustrating a method 1400 that supports subband reference signal measurements in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include selecting, at the UE, one or more subbands of the channel for which the UE is to obtain and transmit the measured signal qualities. The operations of 1405 may be performed in accordance with examples as disclosed herein. In some examples, aspects of the operations of 1405 may be performed by a configuration manager 640 as described with reference to FIG. 6.

At 1410, the method may include receiving a set of reference signals from a base station, each of the set of reference signals spanning a channel and associated with one of a set of transmit beams from the base station. The operations of 1410 may be performed in accordance with examples as disclosed herein. In some examples, aspects of the operations of 1410 may be performed by a reference signal receiver 625 as described with reference to FIG. 6.

At 1415, the method may include measuring a signal quality of each of the set of reference signals, each measured signal quality corresponding to one of a set of multiple subbands of the channel. The operations of 1415 may be performed in accordance with examples as disclosed herein. In some examples, aspects of the operations of 1415 may be performed by a measurement component 630 as described with reference to FIG. 6.

At 1420, the method may include transmitting, to the base station, an indication of at least a first signal quality associated with a first subband of the set of multiple subbands and a first transmit beam of the set of transmit beams. The operations of 1420 may be performed in accordance with examples as disclosed herein. In some examples, aspects of the operations of 1420 may be performed by a signal quality indication manager 635 as described with reference to FIG. 6.

Figure 15:
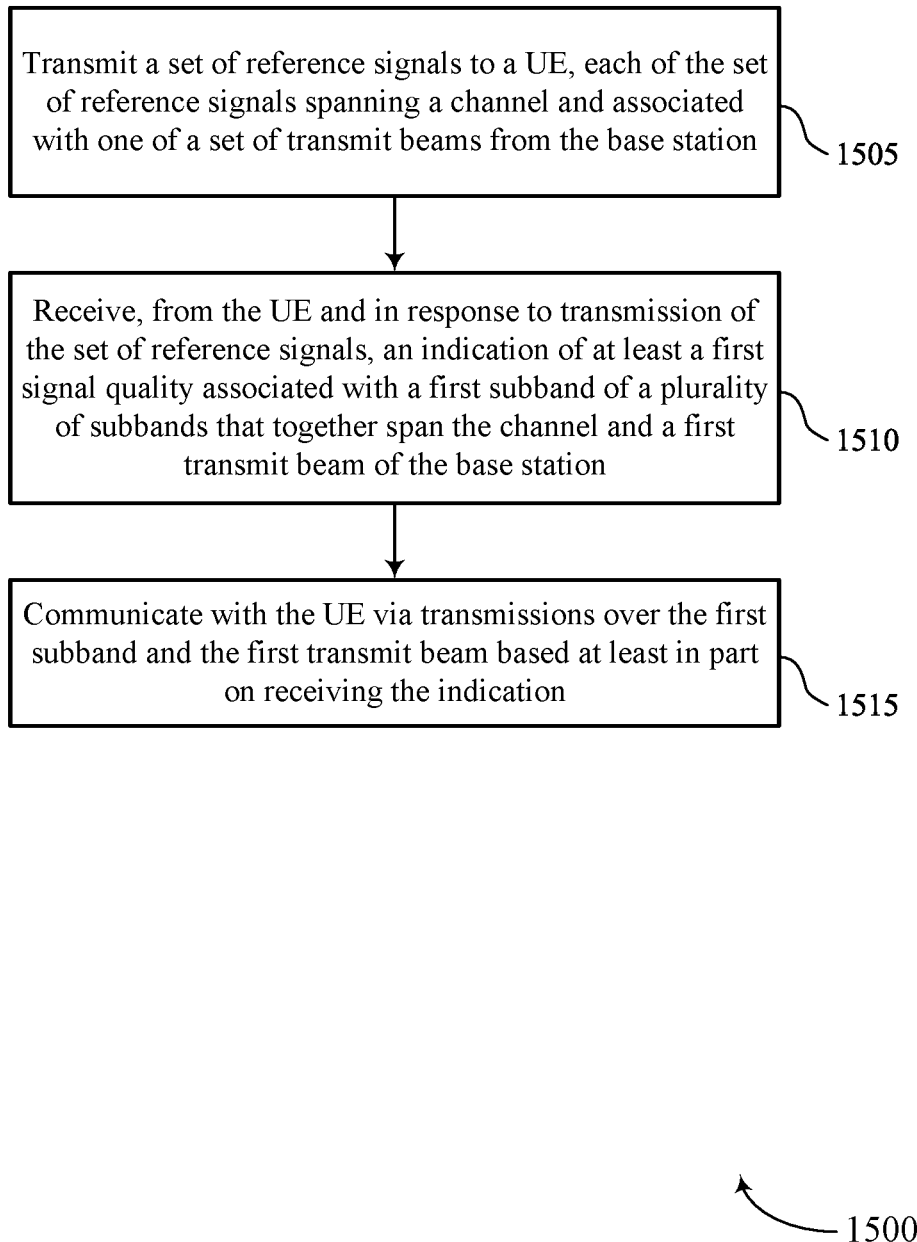

FIG. 15 shows a flowchart illustrating a method 1500 that supports subband reference signal measurements in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting a set of reference signals to a UE, each of the set of reference signals spanning a channel and associated with one of a set of transmit beams from the base station. The operations of 1505 may be performed in accordance with examples as disclosed herein. In some examples, aspects of the operations of 1505 may be performed by a reference signal transmitter 1025 as described with reference to FIG. 10.

At 1510, the method may include receiving, from the UE and in response to transmission of the set of reference signals, an indication of at least a first signal quality associated with a first subband of a set of multiple subbands that together span the channel and a first transmit beam of the base station. The operations of 1510 may be performed in accordance with examples as disclosed herein. In some examples, aspects of the operations of 1510 may be performed by a signal quality indication receiver 1030 as described with reference to FIG. 10.

At 1515, the method may include communicating with the UE via transmissions over the first subband and the first transmit beam based on receiving the indication. The operations of 1515 may be performed in accordance with examples as disclosed herein. In some examples, aspects of the operations of 1515 may be performed by a communication component 1035 as described with reference to FIG. 10.

Figure 16:
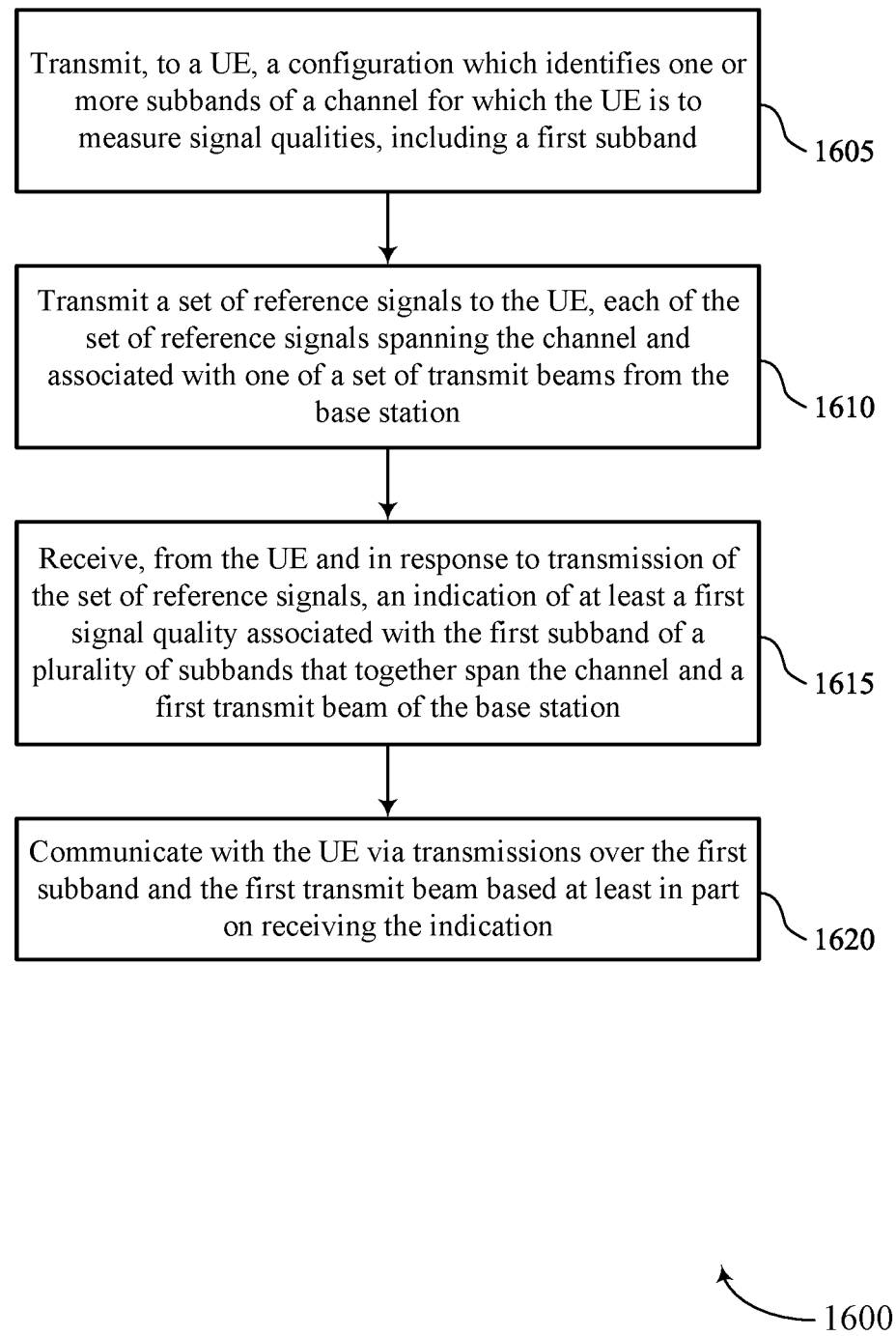

FIG. 16 shows a flowchart illustrating a method 1600 that supports subband reference signal measurements in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to the UE, a configuration which identifies one or more subbands of the channel for which the UE is to measure signal qualities, including the first subband. The operations of 1605 may be performed in accordance with examples as disclosed herein. In some examples, aspects of the operations of 1605 may be performed by a configuration manager 1040 as described with reference to FIG. 10.

At 1610, the method may include transmitting a set of reference signals to a UE, each of the set of reference signals spanning a channel and associated with one of a set of transmit beams from the base station. The operations of 1610 may be performed in accordance with examples as disclosed herein. In some examples, aspects of the operations of 1610 may be performed by a reference signal transmitter 1025 as described with reference to FIG. 10.

At 1615, the method may include receiving, from the UE and in response to transmission of the set of reference signals, an indication of at least a first signal quality associated with a first subband of a set of multiple subbands that together span the channel and a first transmit beam of the base station. The operations of 1615 may be performed in accordance with examples as disclosed herein. In some examples, aspects of the operations of 1615 may be performed by a signal quality indication receiver 1030 as described with reference to FIG. 10.

At 1620, the method may include communicating with the UE via transmissions over the first subband and the first transmit beam based on receiving the indication. The operations of 1620 may be performed in accordance with examples as disclosed herein. In some examples, aspects of the operations of 1620 may be performed by a communication component 1035 as described with reference to FIG. 10.

The following provides an overview of aspects of the present disclosure:

- Aspect 1: A method for wireless communications at a UE, the method comprising: receiving a set of reference signals from a base station, each of the set of reference signals spanning a channel and associated with one of a set of transmit beams from the base station; measuring a signal quality of each of the set of reference signals, each measured signal quality corresponding to one of a plurality of subbands of the channel; and transmitting, to the base station, an indication of at least a first signal quality associated with a first subband of the plurality of subbands and a first transmit beam of the set of transmit beams.
- Aspect 2: The method of aspect 1, further comprising: receiving, from the base station, a configuration which identifies one or more subbands of the channel for which the UE is to obtain and transmit the measured signal qualities.
- Aspect 3: The method of any of aspects 1 through 2, further comprising: selecting, at the UE, one or more subbands of the channel for which the UE is to obtain and transmit the measured signal qualities.
- Aspect 4: The method of any of aspects 1 through 3, wherein transmitting the indication of at least the first signal quality associated with the first subband and the first transmit beam comprises: including in the indication one or more of the measured signal qualities for each of one or more of the plurality of subbands, each of the one or more of the measured signal qualities associated with an individual subband of the one or more of the plurality of subbands corresponding to different ones of the set of transmit beams.
- Aspect 5: The method of aspect 4, further comprising: identifying a first quantity of the set of transmit beams for which the measured signal qualities are to be reported for each of the one or more of the plurality of subbands, wherein a number of the one or more of the measured signal qualities included in the indication for each of the one or more of the plurality of subbands is less than or equal to the first quantity of the set of transmit beams.
- Aspect 6: The method of aspect 5, wherein identifying the first quantity of the set of transmit beams for which the measured signal qualities are to be reported further comprises: receiving an indicator of the first quantity from the base station.
- Aspect 7: The method of any of aspects 5 through 6, wherein identifying the first quantity of the set of transmit beams for which the measured signal qualities are to be reported further comprises: selecting a value of the first quantity at the UE.
- Aspect 8: The method of aspect 7, further comprising: reporting to the base station the selected value of the first quantity.
- Aspect 9: The method of any of aspects 5 through 8, wherein a value of the first quantity is subband-specific.
- Aspect 10: The method of any of aspects 4 through 9, further comprising: selecting the one or more of the measured signal qualities included in the indication for each of the one or more of the plurality of subbands based at least in part on respective strengths of the measured signal qualities of each of the set of reference signals.
- Aspect 11: The method of any of aspects 1 through 10, wherein transmitting the indication of at least the first signal quality associated with the first subband and the first transmit beam comprises: including in the indication one or more of the measured signal qualities for each of one or more of the set of transmit beams, each of the one or more of the measured signal qualities associated with an individual transmit beam of the one or more of the set of transmit beams corresponding to different ones of the plurality of subbands.
- Aspect 12: The method of aspect 11, further comprising: identifying a first quantity of the plurality of subbands for which the measured signal qualities are to be reported for each of the one or more of the set of transmit beams, wherein a number of the one or more of the measured signal qualities included in the indication for each of the one or more of the set of transmit beams is less than or equal to the first quantity of the plurality of subbands.
- Aspect 13: The method of aspect 12, wherein identifying the first quantity of the plurality of subbands for which the measured signal qualities are to be reported further comprises: receiving an indicator of the first quantity from the base station.
- Aspect 14: The method of any of aspects 12 through 13, wherein identifying the first quantity of the plurality of subbands for which the measured signal qualities are to be reported further comprises: selecting a value of the first quantity at the UE.
- Aspect 15: The method of aspect 14, further comprising: reporting to the base station the selected value of the first quantity.
- Aspect 16: The method of any of aspects 12 through 15, wherein a value of the first quantity is transmit beam-specific.

Aspect 17: The method of any of aspects 11 through 16, further comprising: selecting the one or more of the measured signal qualities included in the indication for each of the one or more of the set of transmit beams based at least in part on respective strengths of the measured signal qualities of each of the set of reference signals.

Aspect 18: The method of any of aspects 1 through 17, wherein transmitting the indication of at least the first signal quality associated with the first subband and the first transmit beam comprises: including in the indication one or more of the measured signal qualities for each of one or more pairs of subbands from the plurality of subbands and transmit beams from the set of transmit beams.

Aspect 19: The method of aspect 18, further comprising: receiving, from the base station, an indicator of multiple pairs of subbands and transmit beams from which the one or more pairs are selected; and receiving, from the base station, a first quantity of the multiple pairs of subbands for which the UE is to include corresponding measured signal qualities in the indication transmitted to the base station, the first quantity being equal to a number of the one or more pairs.

Aspect 20: The method of any of aspects 18 through 19, further comprising: transmitting, to the base station, indices of the one or more pairs selected from the multiple pairs.

Aspect 21: The method of any of aspects 1 through 20, wherein a first size of the first subband of the plurality of subbands is different than a second size of a second subband of the plurality of subbands.

Aspect 22: The method of any of aspects 1 through 21, wherein the set of reference signals comprise SSBs, CSI-RSs, or a combination thereof.

Aspect 23: The method of any of aspects 1 through 22, wherein the indication of at least the first signal quality comprises an indicator of an RSRP associated with the first subband and the first transmit beam.

Aspect 24: A method for wireless communications at a base station, the method comprising: transmitting a set of reference signals to a UE, each of the set of reference signals spanning a channel and associated with one of a set of transmit beams from the base station; receiving, from the UE and in response to transmission of the set of reference signals, an indication of at least a first signal quality associated with a first subband of a plurality of subbands that together span the channel and a first transmit beam of the base station; and communicating with the UE via transmissions over the first subband and the first transmit beam based at least in part on receiving the indication Aspect 25: The method of aspect 24, further comprising: transmitting, to the UE, a configuration which identifies one or more subbands of the channel for which the UE is to measure signal qualities, including the first subband.

Aspect 26: The method of any of aspects 24 through 25, wherein receiving the indication of at least the first signal quality associated with the first subband and the first transmit beam comprises: receiving in the indication one or more measured signal qualities for each of one or more of the plurality of subbands, each of the one or more measured signal qualities associated with an individual subband of the one or more of the plurality of subbands corresponding to different ones of the set of transmit beams.

Aspect 27: The method of aspect 26, further comprising: identifying a first quantity of the set of transmit beams for which the measured signal qualities are to be reported for each of the one or more of the plurality of subbands, wherein a number of the one or more measured signal qualities included in the indication for each of the one or more of the plurality of subbands is less than or equal to the first quantity of the set of transmit beams.

Aspect 28: The method of aspect 27, wherein identifying the first quantity of the set of transmit beams for which the measured signal qualities are to be reported further comprises: transmitting an indicator of the first quantity to the UE.

Aspect 29: The method of any of aspects 27 through 28, wherein identifying the first quantity of the set of transmit beams for which the measured signal qualities are to be reported further comprises: receiving a report from the UE of a UE-selected value of the first quantity.

Aspect 30: The method of any of aspects 27 through 29, wherein a value of the first quantity is subband-specific.

Aspect 31: The method of any of aspects 24 through 30, wherein receiving the indication of at least the first signal quality associated with the first subband and the first transmit beam comprises: receiving in the indication one or more measured signal qualities for each of one or more of the set of transmit beams, each of the one or more measured signal qualities associated with an individual transmit beam of the one or more of the set of transmit beams corresponding to different ones of the plurality of subbands.

Aspect 32: The method of aspect 31, further comprising: identifying a first quantity of the plurality of subbands for which the measured signal qualities are to be reported for each of the one or more of the set of transmit beams, wherein a number of the one or more measured signal qualities included in the indication for each of the one or more of the set of transmit beams is less than or equal to the first quantity of the plurality of subbands.

Aspect 33: The method of aspect 32, wherein identifying the first quantity of the plurality of subbands for which the measured signal qualities are to be reported further comprises: transmitting an indicator of the first quantity to the UE.

Aspect 34: The method of any of aspects 32 through 33, wherein identifying the first quantity of the plurality of subbands for which the measured signal qualities are to be reported further comprises: receiving a report from the UE indicating a UE-selected value of the first quantity.

Aspect 35: The method of any of aspects 32 through 34, wherein a value of the first quantity is transmit beam-specific.

Aspect 36: The method of any of aspects 24 through 35, wherein receiving the indication of at least the first signal quality associated with the first subband and the first transmit beam comprises: receiving in the indication one or more measured signal qualities for each of one or more pairs of subbands from the plurality of subbands and transmit beams from the set of transmit beams.

Aspect 37: The method of aspect 36, further comprising: transmitting, to the UE, an indicator of multiple pairs of subbands and transmit beams from which the one or more pairs are selected; and transmitting, to the UE, a first quantity of the multiple pairs of subbands for which the UE is to include corresponding measured signal qualities in the indication transmitted to the base station, the first quantity being equal to a number of the one or more pairs.

Aspect 38: The method of any of aspects 36 through 37, further comprising: receiving, from the UE, indices of the one or more pairs selected by the UE from the multiple pairs.

Aspect 39: The method of any of aspects 24 through 38, wherein a first size of the first subband of the plurality of subbands is different than a second size of a second subband of the plurality of subbands.

Aspect 40: The method of any of aspects 24 through 39, wherein the set of reference signals comprise SSBs, CSI-RSs, or a combination thereof.

Aspect 41: The method of any of aspects 24 through 40, wherein the indication of at least the first signal quality comprises an indicator of an RSRP associated with the first subband and the first transmit beam.

Aspect 42: An apparatus for wireless communications at a UE, comprising a processor; memory coupled with the processor; and instructions stored in the memory and executable by the processor to cause the apparatus to perform a method of any of aspects 1 through 23.

Aspect 43: An apparatus for wireless communications at a UE, comprising at least one means for performing a method of any of aspects 1 through 23.

Aspect 44: A non-transitory computer-readable medium storing code for wireless communications at a UE, the code comprising instructions executable by a processor to perform a method of any of aspects 1 through 23.

Aspect 45: An apparatus for wireless communications at a base station, comprising a processor; memory coupled with the processor; and instructions stored in the memory and executable by the processor to cause the apparatus to perform a method of any of aspects 24 through 41.

Aspect 46: An apparatus for wireless communications at a base station, comprising at least one means for performing a method of any of aspects 24 through 41.

Aspect 47: A non-transitory computer-readable medium storing code for wireless communications at a base station, the code comprising instructions executable by a processor to perform a method of any of aspects 24 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), the method comprising:
   receiving a set of reference signals from a base station, each reference signal of the set of reference signals spanning a channel and associated with one transmit beam of a set of transmit beams from the base station, wherein the channel comprises a plurality of subbands;
   selecting, at the UE, a value of a first quantity of the plurality of subbands of the channel for which the UE is to obtain and transmit measured signal powers, wherein individual ones of the plurality of subbands have different subband sizes;
   measuring a signal power of each of the first quantity of the plurality of subbands; and
   transmitting, to the base station, an indication of at least a first signal power associated with a first subband of the first quantity of the plurality of subbands and a first transmit beam of the set of transmit beams.

2. The method of claim 1, wherein transmitting the indication of at least the first signal power associated with the first subband and the first transmit beam comprises:
   including, in the indication, one or more of the measured signal powers for each of the first quantity of the plurality of subbands, each of the one or more of the measured signal powers associated with an individual subband of the first quantity of the plurality of subbands corresponding to different ones of the set of transmit beams.

3. The method of claim 2, further comprising:
   identifying a second quantity of the set of transmit beams for which the measured signal powers are to be reported for each of the first quantity of the plurality of subbands, wherein a number of the one or more of the measured signal powers included in the indication for each of the one or more subbands is less than or equal to the second quantity of the set of transmit beams.

4. The method of claim 3, wherein the value of the first quantity is subband-specific.

5. The method of claim 2, further comprising:
   selecting the one or more of the measured signal powers included in the indication for each of the first quantity of the plurality of subbands based at least in part on respective strengths of the measured signal powers of each of the set of reference signals.

6. The method of claim 1, wherein transmitting the indication of at least the first signal power associated with the first subband and the first transmit beam comprises:
   including in the indications one or more of the measured signal powers for each of one or more of the set of transmit beams, each of the one or more of the measured signal powers associated with an individual transmit beam of the one or more of the set of transmit beams corresponding to different ones of the first quantity of the plurality of subbands.

7. The method of claim 6, further comprising:
   identifying the first quantity of the plurality of subbands for which the measured signal powers are to be reported for each of the one or more of the set of transmit beams, wherein a number of the one or more of the measured signal powers included in the indication for each of the one or more of the set of transmit beams is less than or equal to the first quantity of the plurality of subbands.

8. The method of claim 6, further comprising:
   selecting the one or more of the measured signal powers included in the indication for each of the one or more of the set of transmit beams based at least in part on respective strengths of the measured signal powers of each of the set of reference signals.

9. The method of claim 1, wherein transmitting the indication of at least the first signal power associated with the first subband and the first transmit beam comprises:
   including, in the indication, one or more of the measured signal powers for each of one or more pairs of subbands and transmit beams from the first quantity of the plurality of subbands and from the set of transmit beams.

10. The method of claim 9, further comprising:
    receiving, from the base station, an indicator of multiple pairs of subbands and transmit beams from which the one or more pairs are selected; and
    receiving, from the base station, a second quantity of the multiple pairs of subbands and transmit beams for which the UE is to include corresponding measured signal powers in the indication transmitted to the base station, the second quantity being equal to a number of the one or more pairs.

11. The method of claim 9, further comprising:
    transmitting, to the base station, indices of the one or more pairs selected from multiple pairs of subbands.

12. The method of claim 1, wherein the set of reference signals comprise synchronization signal blocks, channel state information reference signals, or a combination thereof.

13. The method of claim 1, wherein the indication of at least the first signal power comprises an indicator of a reference signal received power associated with the first subband and the first transmit beam.

14. The method of claim 1, wherein the signal power of each of the first quantity of the plurality of subbands comprises a layer one (L1) reference signal received power.

15. A method for wireless communications at a base station, the method comprising:
transmitting a set of reference signals to a user equipment (UE), each of the set of reference signals spanning a channel and associated with one of a set of transmit beams from the base station, where the channel comprises a plurality of subbands;
receiving, from the UE, a report indicative of at least a first signal power associated with a first subband of a first quantity of the plurality of subbands and a first transmit beam of the base station, wherein individual ones of the plurality of subbands have different subband sizes, and wherein the report is further indicative of a value of the first quantity; and
communicating with the UE via transmissions over the first subband and the first transmit beam based at least in part on receiving the indication.

16. The method of claim 15, wherein receiving the indication of at least the first signal power associated with the first subband and the first transmit beam comprises:
receiving in the indication one or more measured signal powers for each of the plurality of subbands, each of the one or more measured signal powers associated with an individual subband of the first quantity of the plurality of subbands corresponding to different ones of the set of transmit beams.

17. The method of claim 16, further comprising:
identifying a second first quantity of the set of transmit beams for which measured signal powers are to be reported for each of the first quantity of the plurality of subbands, wherein a number of the one or more measured signal powers included in the indication for each of the one or more subbands is less than or equal to the second quantity of the set of transmit beams.

18. The method of claim 15, wherein receiving the indication of at least the first signal power associated with the first subband and the first transmit beam comprises:
receiving in the indication one or more measured signal powers for each of one or more of the set of transmit beams, each of the one or more measured signal powers associated with an individual transmit beam of the one or more of the set of transmit beams corresponding to different ones of the first quantity of the plurality of subbands.

19. The method of claim 18, further comprising:
identifying the first quantity of the plurality of subbands for which measured signal powers are to be reported for each of the one or more of the set of transmit beams, wherein a number of the one or more measured signal powers included in the indication for each of the one or more of the set of transmit beams is less than or equal to the first quantity of the plurality of subbands.

20. The method of claim 15, wherein receiving the indication of at least the first signal power associated with the first subband and the first transmit beam comprises:
receiving, in the indication, one or more measured signal powers for each of one or more pairs of subbands and transmit beams from the first quantity of the plurality of subbands and the set of transmit beams.

21. The method of claim 20, further comprising:
transmitting, to the UE, an indicator of multiple pairs of subbands and transmit beams from which the one or more pairs are selected; and
transmitting, to the UE, a second quantity of the multiple pairs of subbands and transmit beams for which the UE is to include corresponding measured signal powers in the indication transmitted to the base station, the second quantity being equal to a number of the one or more pairs.

22. The method of claim 20, further comprising:
receiving, from the UE, indices of the one or more pairs selected by the UE from multiple pairs of subbands.

23. The method of claim 15, wherein the set of reference signals comprise synchronization signal blocks, channel state information reference signals, or a combination thereof.

24. The method of claim 15, wherein the indication of at least the first signal power comprises an indicator of a reference signal received power associated with the first subband and the first transmit beam.

25. A user equipment (UE), comprising:
one or more memories storing processor-executable code; and
one or more processors coupled with the one or more memories, wherein the one or more processors are individually or collectively configured to cause the UE to:
receive a set of reference signals from a base station, each reference signal of the set of reference signals spanning a channel and associated with one transmit beam of a set of transmit beams from the base station, wherein the channel comprises a plurality of subbands;
select, at the UE, a value of a first quantity of the plurality of subbands for which the UE is to obtain and transmit measured signal powers, wherein individual ones of the plurality of subbands have different subband sizes;
measure a signal power of each of the first quantity of the plurality of subbands; and
transmit, to the base station, an indication of at least a first signal power associated with a first subband of the first quantity of the plurality of subbands and a first transmit beam of the set of transmit beams.

26. A base station, comprising:
one or more memories storing processor-executable code; and
one or more processors coupled with the one or more memories, wherein the one or more processors are individually or collectively configured to cause the base station to:
transmit a set of reference signals to a user equipment (UE), each of the set of reference signals spanning a channel and associated with one of a set of transmit beams from the base station, where the channel comprises a plurality of subbands;
receive, from the UE, a report indicative of at least a first signal power associated with a first subband of a first quantity of the plurality of subbands and a first transmit beam of the base station, wherein individual ones of the plurality of subbands have different subband sizes, and wherein the report is further indicative of a value of the first quantity; and
communicate with the UE via transmissions over the first subband and the first transmit beam based at least in part on receiving the indication.

\* \* \* \* \*